(12) United States Patent
Machida

(10) Patent No.: US 8,937,904 B2
(45) Date of Patent: Jan. 20, 2015

(54) WIRELESS COMMUNICATION SYSTEM

(75) Inventor: Mamoru Machida, Kawasaki (JP)

(73) Assignee: Fujitsu, Limited, Kawasaki (JP)

( * ) Notice: Subject to any disclaimer, the term of this patent is extended or adjusted under 35 U.S.C. 154(b) by 597 days.

(21) Appl. No.: 13/277,772

(22) Filed: Oct. 20, 2011

(65) Prior Publication Data
US 2012/0155446 A1 Jun. 21, 2012

(30) Foreign Application Priority Data

Dec. 21, 2010 (JP) ................................. 2010-284279

(51) Int. Cl.
*H04W 4/00* (2009.01)
*H04W 52/02* (2009.01)
*H04W 88/08* (2009.01)

(52) U.S. Cl.
CPC ........ *H04W 52/0232* (2013.01); *H04W 88/085* (2013.01)
USPC ....................................................... 370/328

(58) Field of Classification Search
CPC ......................... H04W 52/02; H04W 52/0206
USPC ................................................. 370/328, 338
See application file for complete search history.

(56) References Cited

U.S. PATENT DOCUMENTS

| | | | |
|---|---|---|---|
| 2003/0007214 A1 | 1/2003 | Aburakawa et al. |
| 2006/0172775 A1 | 8/2006 | Conyers et al. |
| 2007/0177552 A1 | 8/2007 | Wu et al. |
| 2007/0230328 A1 | 10/2007 | Saitou |
| 2008/0119198 A1 | 5/2008 | Hettstedt et al. |
| 2008/0214221 A1 | 9/2008 | Kiyomoto et al. |

FOREIGN PATENT DOCUMENTS

| | | |
|---|---|---|
| EP | 1892970 | 2/2008 |
| JP | 2006-081014 | 3/2006 |
| JP | 2006-332937 A | 12/2006 |
| JP | 3854446 | 12/2006 |
| JP | 2007-274048 | 10/2007 |
| JP | 2010-509816 | 3/2010 |

(Continued)

OTHER PUBLICATIONS

Extended European search report issued for corresponding European Application No. 11186770.1 dated Jul. 4, 2012.

(Continued)

*Primary Examiner* — Dang Ton
*Assistant Examiner* — Kevin Lee
(74) *Attorney, Agent, or Firm* — Myers Wolin, LLC

(57) ABSTRACT

A wireless communication system includes: a plurality of mobile terminals; a plurality of transceivers, each of the transceivers performing wireless communication with a mobile terminal; a plurality of baseband processors which modulates data to be transmitted to one of the transceivers and demodulates data received from one of the transceivers; a switch which switches the connection of the transceivers and the baseband processors; and a controller which calculates an operation rate of the transceivers and the baseband processors, respectively, continues or stops a power supply for driving the transceivers and the baseband processors in accordance with a calculation result of the operation rate, and controls the switch to reconnect the transceivers coupled to one of the baseband processor of which the power supply has been stopped to another baseband processor of which the power supply is continued.

6 Claims, 18 Drawing Sheets

(56) References Cited

FOREIGN PATENT DOCUMENTS

WO      98/24256      6/1998
WO      02/07464      1/2002
WO      2006/134642 A1      12/2006

OTHER PUBLICATIONS

Notification of Reason for Refusal issued for corresponding Japanese Patent Application No. 2010-284279, dispatched on May 27, 2014, with a partial English translation.

| 82 NUMBER OF UE | 83 RRH7 | 84 RRH8 | 85 RRH9 | 86 RRH10 | 87 RRH11 | 88 RRH12 | 89 RRH13 | 90 RRH14 | 91 RRH15 |
|---|---|---|---|---|---|---|---|---|---|
| 92 LARGE | 1 | 2 | 3 | 4 | 5 | 6 | 7 | 8 | 9 |
| 93 MEDIUM | 1 | 1 | 1 | 2 | 2 | 2 | 3 | 3 | 3 |
| 94 SMALL | 1 | 1 | 1 | 1 | 1 | 1 | 1 | 1 | 1 |

| 95 NUMBER OF UE | 96 BBU3-1 | 97 BBU3-2 | 98 BBU3-3 | 99 BBU4-1 | 100 BBU4-2 | 101 BBU4-3 | 102 BBU5-1 | 103 BBU5-2 | 104 BBU5-3 |
|---|---|---|---|---|---|---|---|---|---|
| 105 LARGE | 1 | 2 | 3 | 4 | 5 | 6 | 7 | 8 | 9 |
| 106 MEDIUM | 1 | 2 | 3 | – | – | – | – | – | – |
| 107 SMALL | 1 | – | – | – | – | – | – | – | – |

|  | BBU3-1 | BBU3-2 | BBU3-3 | BBU4-1 | BBU4-2 | BBU4-3 | BBU5-1 | BBU5-2 | BBU5-3 |
|---|---|---|---|---|---|---|---|---|---|
| RRH7 | ○ | - | - | - | - | - | - | - | - |
| RRH8 | - | ○ | - | - | - | - | - | - | - |
| RRH9 | - | - | ○ | - | - | - | - | - | - |
| RRH10 | - | - | - | ○ | - | - | - | - | - |
| RRH11 | - | - | - | - | ○ | - | - | - | - |
| RRH12 | - | - | - | - | - | ○ | - | - | - |
| RRH13 | - | - | - | - | - | - | ○ | - | - |
| RRH14 | - | - | - | - | - | - | - | ○ | - |
| RRH15 | - | - | - | - | - | - | - | - | ○ |

|  | BBU3-1 | BBU3-2 | BBU3-3 | BBU4-1 | BBU4-2 | BBU4-3 | BBU5-1 | BBU5-2 | BBU5-3 |
|---|---|---|---|---|---|---|---|---|---|
| RRH7 | ○ | - | - | - | - | - | - | - | - |
| RRH8 | ○ | - | - | - | - | - | - | - | - |
| RRH9 | ○ | - | - | - | - | - | - | - | - |
| RRH10 | - | ○ | - | - | - | - | - | - | - |
| RRH11 | - | ○ | - | - | - | - | - | - | - |
| RRH12 | - | ○ | - | - | - | - | - | - | - |
| RRH13 | - | - | ○ | - | - | - | - | - | - |
| RRH14 | - | - | ○ | - | - | - | - | - | - |
| RRH15 | - | - | ○ | - | - | - | - | - | - |
| ADDITION | RRH7, 8, 9 | RRH10, 11, 12 | RRH13, 14, 15 | - | - | - | - | - | - |

|  | BBU3-1 | BBU3-2 | BBU3-3 | BBU4-1 | BBU4-2 | BBU4-3 | BBU5-1 | BBU5-2 | BBU5-3 |
|---|---|---|---|---|---|---|---|---|---|
| RRH7 | ○ | - | - | - | - | - | - | - | - |
| RRH8 | ○ | - | - | - | - | - | - | - | - |
| RRH9 | ○ | - | - | - | - | - | - | - | - |
| RRH10 | ○ | - | - | - | - | - | - | - | - |
| RRH11 | ○ | - | - | - | - | - | - | - | - |
| RRH12 | ○ | - | - | - | - | - | - | - | - |
| RRH13 | ○ | - | - | - | - | - | - | - | - |
| RRH14 | ○ | - | - | - | - | - | - | - | - |
| RRH15 | ○ | - | - | - | - | - | - | - | - |
| ADDITION | TOTAL ADDITION | - | - | - | - | - | - | - | - |

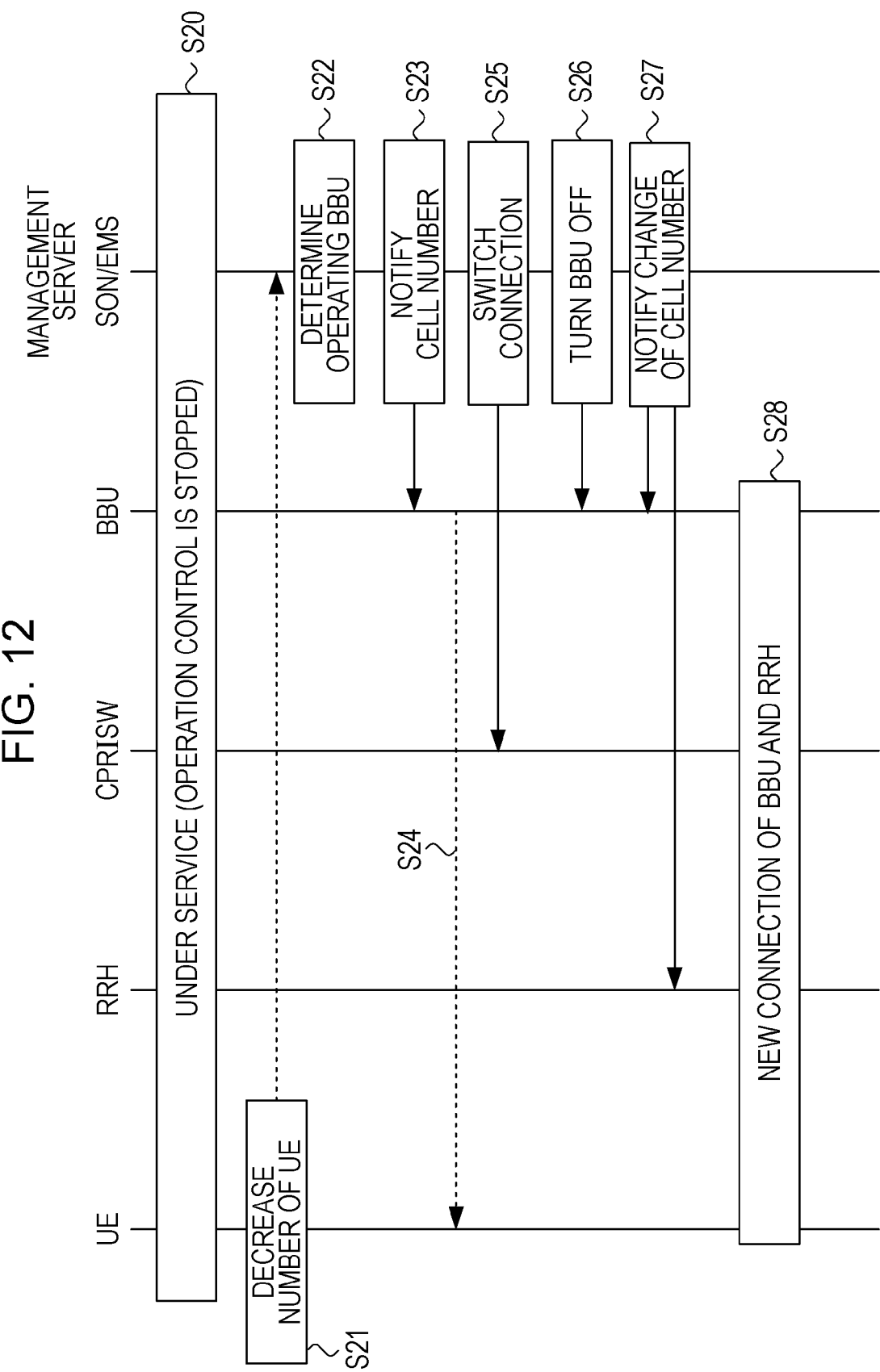

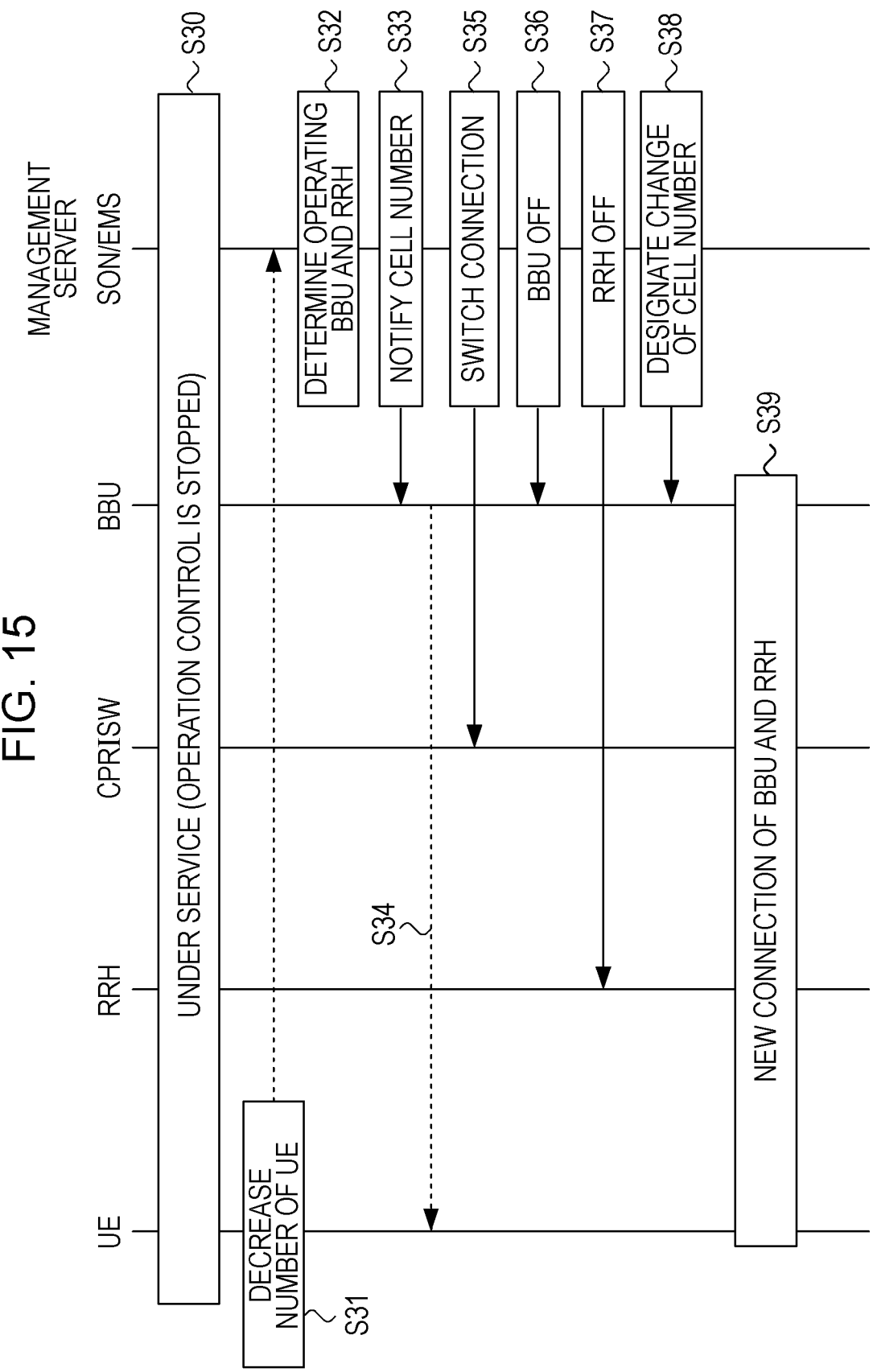

WIRELESS COMMUNICATION SYSTEM

CROSS-REFERENCE TO RELATED APPLICATION

This application is based upon and claims the benefit of priority of the prior Japanese Patent Application No. 2010-284279, filed on Dec. 21, 2010, the entire contents of which are incorporated herein by reference.

FIELD

The embodiments discussed herein are related to a wireless communication system which controls power supply of a base station in accordance with an amount of data traffic.

BACKGROUND

A wireless control system includes a base station which performs wireless communication with a mobile terminal. The base station includes a wireless unit which performs wireless communication with a mobile terminal, and a baseband signal processor which performs baseband processes, such as modulation and demodulation of signals. The mobile terminal is called user equipment (UE).

In order to perform easy maintenance of the base station and reduce maintenance cost, a wireless unit and the baseband signal processor are sometimes installed separately from the base station. The wireless unit separated from the base station is called a remote radio head (RRH). The wireless unit is a kind of transceiver. The baseband signal processor separated from the base station is called a baseband unit (BBU).

In order to interconnect the RRH and the BBU which were provided by different vendors, the protocol interface in the communication between the RRH and the BBU has been standardized. An example of the standardized interface is the common public radio interface (CPRI).

Multiple UEs perform wireless communication with a single RRH. Multiple RRHs perform packet communication with a single BBU. The plurality of BBUs are coupled to a single management server which manages a network of the entire wireless control system. The management server functions as an element management system (EMS) which monitors the entire amount of data traffic, and it functions as a self organizing network (SON) which automates installation and operation of the base station. The SON optimizes the operation of the BBU and the RRH in accordance with the information about the amount of data traffic acquired by the EMS. Techniques about the wireless communication system are disclosed in the following literatures.

Japanese Laid-open Patent Publication No. 2007-274048 and Japanese Laid-open Patent Publication No. 2010-509816 are examples of related art.

In the wireless communication system, each UE has the status of use which is different from those of other UEs. The status of use of each UE changes over time. Therefore, the operation rate of the RRH which performs wireless communication with plurality of UEs and the operation rate of the BBU which performs packet telecommunication with multiple RRHs also change over time. However, since the BBU which performs packet telecommunication with a single RRH is fixed, the packet processing of the RRH coupled to the BBU cannot be distributed to other BBUs no matter how the operation rate of that BBU is low.

SUMMARY

According to an aspect of the embodiment, a wireless communication system includes: a plurality of mobile terminals; a plurality of transceivers having a specific area, respectively, each of the plurality of transceivers performing wireless communication with a mobile terminal which is in the specific area; a plurality of baseband processors which modulate data to be transmitted to one of the plurality of transceivers and demodulate data received from one of the plurality of transceivers; a switch which switches the connection of the plurality of transceivers and the plurality of baseband processors; and a controller which calculates an operation rate of the transceivers and the baseband processors, respectively, continues or stops a power supply for driving the transceivers and the baseband processors in accordance with a calculation result of the operation rate, and controls the switch to reconnect the transceivers coupled to one of the baseband processor of which the power supply has been stopped to another baseband processor of which the power supply is continued.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8A and 8B are correspondence tables of the number of UEs performing wireless communication and the cell numbers assigned to each RRH and each BBU;

FIGS. 9A to 9C are tables illustrating the relation of connection of each BBU and each RRH in accordance with the number of UEs;

FIG. 12 is a process flowchart illustrating a shift from a state in which the operation control is stopped to a state in which the operation control is executed;

FIG. 15 is a process flowchart illustrating a shift from a state in which the operation control is stopped to a state in which the operation control is executed;

DESCRIPTION OF EMBODIMENTS

Hereinafter, an embodiment of the present invention will be described. Combinations of the configurations in the embodiment are included in the embodiment.

Figure 1:
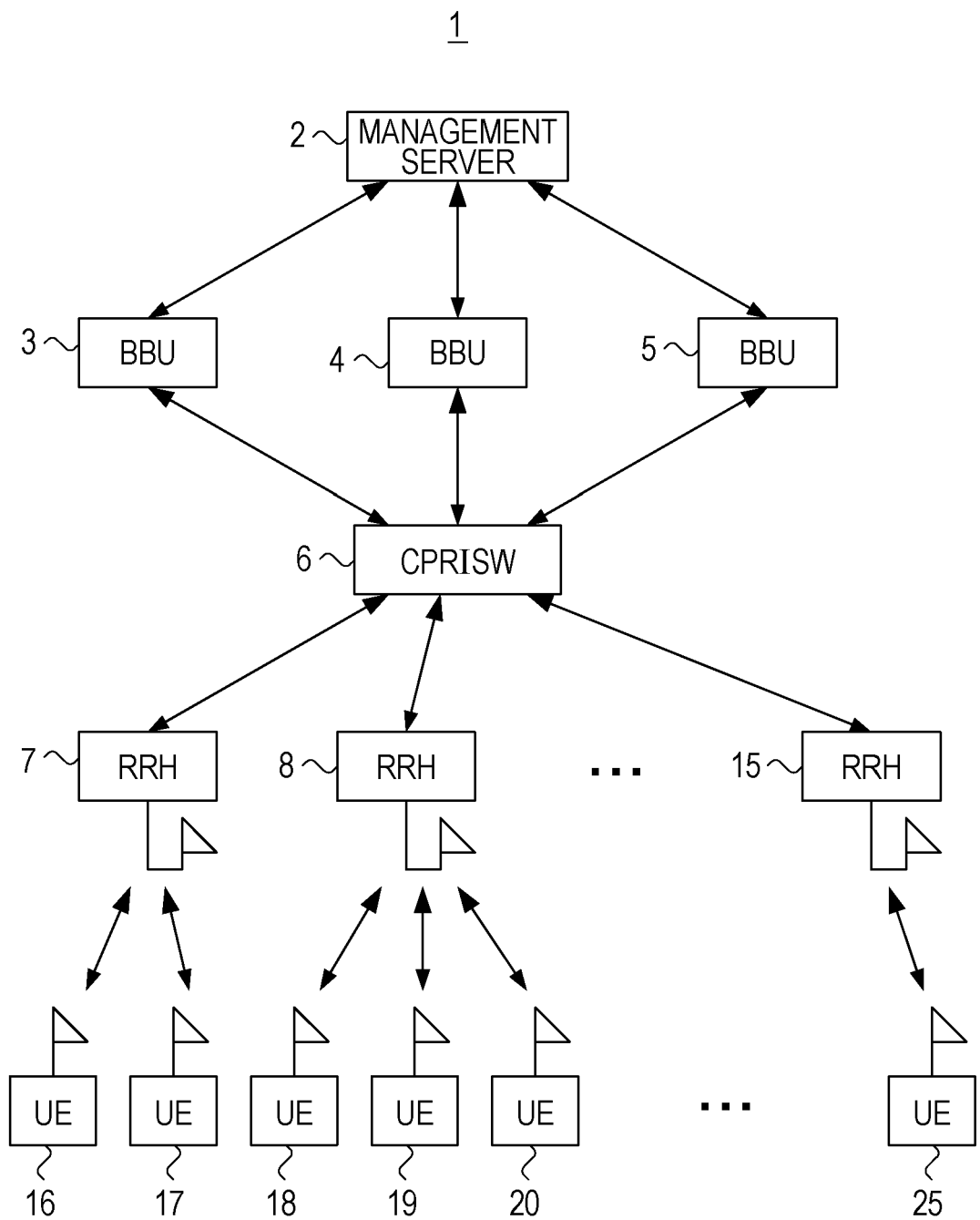
FIG. 1 is a block diagram of a wireless communication system according to the present embodiment.

FIG. 1 is a block diagram of a wireless communication system 1 according to the present embodiment. The wireless communication system 1 includes a management server 2, BBUs 3, 4 and 5, a CPRI switch (CPRISW) 6, RRHs 7 to 15 and UEs 16 to 25. The wireless communication system 1 includes three BBUs, nine RRHs and ten UEs, but the number of BBU, RRH and UE which constitute the wireless communication system 1 is not limited thereto.

The management server 2 monitors the operation rate of each device of the wireless communication system 1 and the relation of connection among the devices. The management server 2 is an example of a controller which performs power supply management of each device and switch control of the relation of connection among the devices in accordance with the operation rate of each device and the monitoring result of the relation of connection.

The BBUs 3, 4 and 5 are examples of baseband processors which perform baseband signal processing of the base station. In the present embodiment, a single BBU is capable of performing baseband signal processing from up to three RRHs. Power supply of each BBU is capable of being turned on and off by a control signal from the management server 2. The number of BBUs is three in the present embodiment but the number of BBU is not limited thereto. In the present embodiment, a single BBU includes a baseband signal processor which may separately process a baseband signal from three RRHs.

The CPRISW 6 is an example of a switch which switches connection between each BBU and each RRH. Switching operation by the CPRISW 6 is controlled by the management server 2. The CPRISW 6 copies a packet signal received from a single BBU in accordance with the connection state and transmits the copied packet signal to a plurality of RRHs. Also, the CPRISW 6 adds the packet signal received from the plurality of RRHs and transmits to the added packet signal to a single BBU.

The RRHs 7 to 15 convert the packet signal received from any of the BBUs into a wireless signal. Each RRH is an example of the wireless unit which transmits the converted wireless signal to each UE. Each RRH receives the wireless signal from each UE. Each RRH includes a specific area in which the RRH is capable of communicating with each UE. The specific area is determined by the signal amplification capability of the RRH and the directivity of an antenna. The specific area is called a cell. The identification number provided to the cell is called a cell number.

The UEs 16 to 25 are examples of mobile terminals which transmit and receive the wireless signal. Each UE is a mobile terminal capable of performing wireless communication with any of the RRHs. The cell to which each UE belongs is determined by the positional relationship with each RRH. Each UE has an operation condition and an amount of communication data which are different from those of other RRHs.

Figure 2:
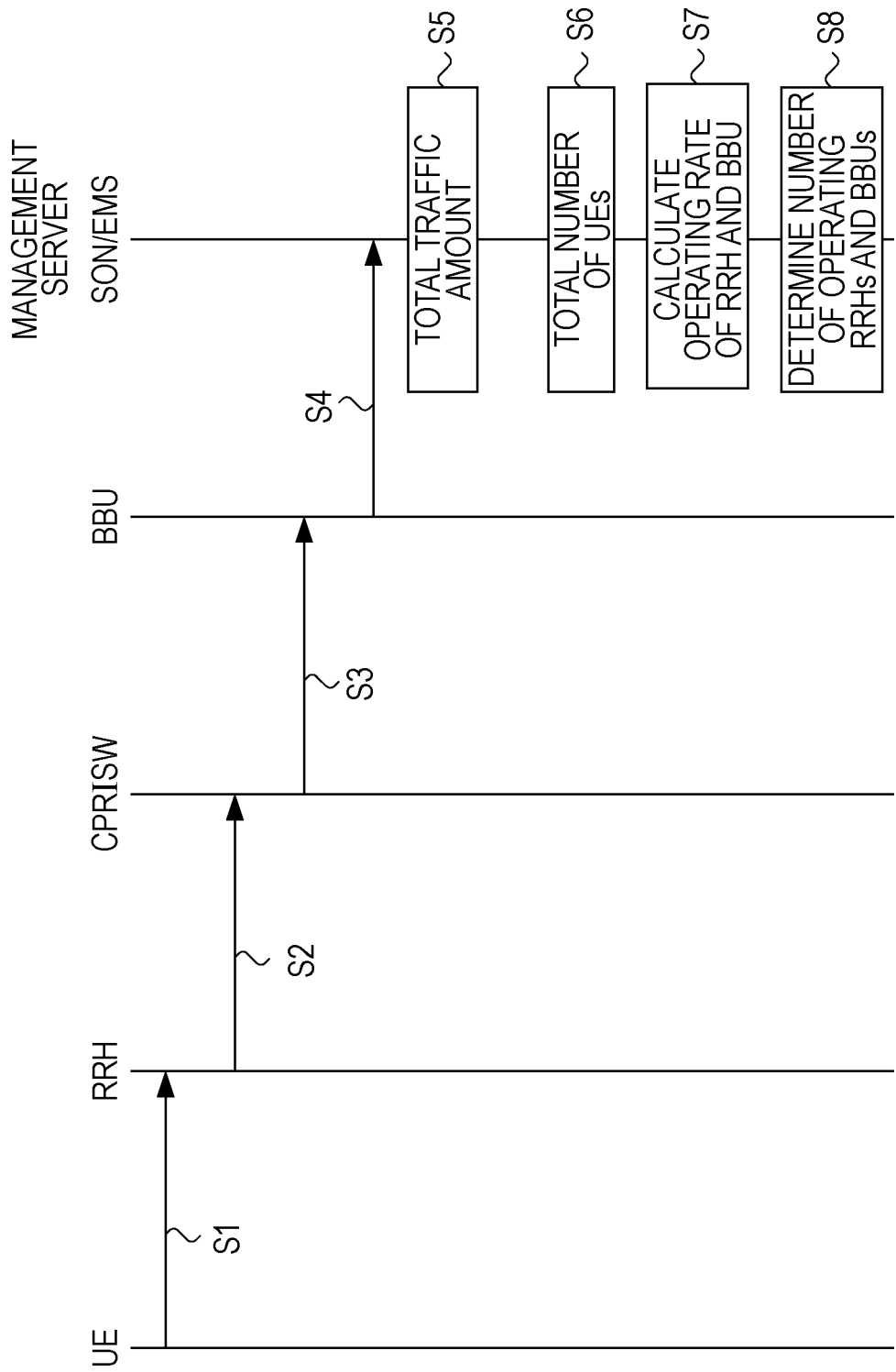
FIG. 2 is a process flowchart for the understanding of the operation condition of the wireless communication system.

FIG. 2 is a process flowchart for the understanding of the operation condition of the wireless communication system 1. Each UE has an identification number assigned for the identification thereof. The management server 2 manages the identification number of each UE together with the cell number assigned to each UE. Each UE periodically transmits, to the RRH, the traffic amount information representing its own traffic amount together with its own identification number (S1).

Each RRH which received the traffic amount information and the identification number of each UE transmits the received information to the CPRISW 6 (S2). The CPRISW 6 transmits the traffic amount information and the identification number received from each RRH to the BBU designated as a connection destination by the management server 2 (S3).

Each BBU notifies the traffic amount information and the identification number of each UE received from each RRH to the management server 2 (S4). The management server 2 totals the traffic amount processed by each RRH and each BBU in accordance with the received information (S5). The management server 2 totals the number of UEs under communication with each RRH in accordance with the identification number of each UE (S6). The management server 2 calculates the operation rate of each RRH and each BBU in accordance with the traffic amount and the number of UEs which are totaled. The management server 2 calculates the operation rate in accordance with the ratio between the traffic amount and the number of UEs processable by each RRH and each BBU and the current traffic amount and the current number of UEs (S7). The management server 2 determines whether each RRH and each BBU are to operate or to stop in accordance with the calculated operation rate (S8). In the management server 2, the EMS monitors the traffic amount. Determining whether each RRH and each BBU are to operate or to stop in accordance with the operation rate includes determining whether each RRH and each BBU are to operate or to stop in accordance with the operation determination table which will be described later.

As described above, the management server 2 is capable of determining whether each RRH and each BBU which constitute the wireless communication system 1 are to operate or to stop in accordance with the traffic amount information and the identification number of each UE.

Figure 3:
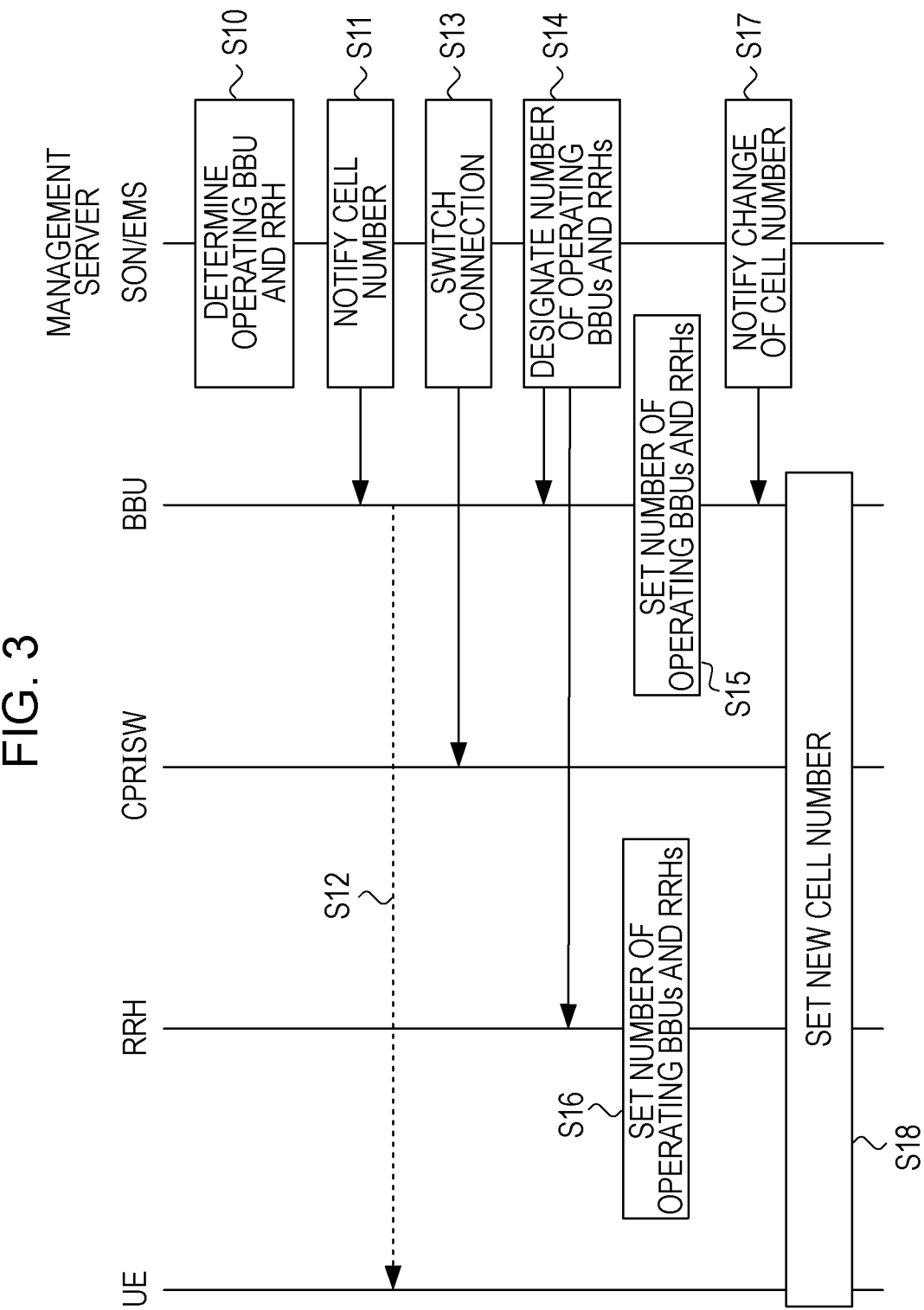
FIG. 3 is a process flowchart illustrating the change of the operation condition of the wireless communication system.

FIG. 3 is a process flowchart illustrating the change of the operation condition of the wireless communication system 1. The management server 2 switches between the operation and stop of each RRH and each BBU which constitute the wireless communication system 1 in accordance with the operation state of the wireless communication system 1 obtained by the process of FIG. 2. Switching between the operation and stop is performed by the SON of the management server 2. The SON switches between the operation and stop of each RRH and each BBU in accordance with the operation state monitored by the EMS.

The management server 2 determines whether the BBU and the RRH are to operate or to stop in accordance with the monitoring result of the EMS (S10). Determination about operation and stop of each BBU and each RRH is made in accordance with the monitoring result of the EMS and an operation determination table which will be described later. Details of the operation determination table will be described later. The management server 2 determines the cell number to be assigned to the cell covered by an operating RRH in accordance with the monitoring result and the operation determination table of the EMS. The cell is a range in which a single RRH transmits radio waves to the UE. The management server 2 assigns a single frequency to a single cell number. Since each cell number is assigned with a frequency which is different from those of other cell numbers, the cell is capable of performing wireless communication with the RRH to which the cell number to which the UE belongs has been assigned even if the UE exists in an area covered by a plurality of cells with different cell numbers.

The management server 2 notifies the determined cell number to each BBU (S11). Each BBU notifies the received cell number to each UE via each RRH (S12). Each UE changes the cell number autonomously by the execution of a compulsory handover after a certain period of time elapsed. Previous notification allows each UE to start the handover to a new cell number before the switching operation of the operational state of each BBU and each RRH is performed.

The management server 2 transmits, to the CPRISW 6, a switching signal used for the switching of each RRH which is the connection destination of each BBU in accordance with determination result in step S11 (S13). The CPRISW 6 performs switching operation of connection simultaneously with the cell number change notification which will be described later in accordance with the switching signal received from the management server 2.

The management server 2 outputs a control signal for the instruction to operate or to stop each BBU and each RRH in accordance with the determination result in step S11 (S14). Each BBU which received the control signal determines to operate or to stop in accordance with the control signal (S15). Each RRH which received the control signal determines to operate or to stop in accordance with the control signal (S16).

After the notification of the changed cell number to each BBU and each UE, the management server 2 outputs a cell number change notification signal to each BBU and each RRH (S17). When a certain time period elapsed since the cell number is notified in step S12 and the cell number of each UE is changed to a new cell number, each BBU and each RRH which received the cell number change notification signal are set to have the new cell numbers and the CPRISW 6 switches the connection (S18). Each BBU and each RRH operate or stop in accordance with the control signal.

The cell number change notification in step S17 may be performed by a packet signal which has a frame number notified to, for example, each BBU, the CPRISW 6 and each RRH at the time of notification of the cell number in step S11. By letting the frame numbers at the time at which the switching operation to the new cell number is made be notified from the management server 2, each BBU and each RRH are capable of receiving a packet signal which includes the frame number and thereby performing the switching operation to the new cell number. The CPRISW 6 receives the packet signal which includes the frame numbers and, simultaneously, performs the switching operation of connection. In this case, each BBU, the CPRISW 6 and each RRH include an own storage unit which stores the notified frame number. The following embodiments have the same configuration.

A counter may be mounted on each BBU, the CPRISW 6 and each RRH in order to count a difference value between the current frame number and the frame number at the time of switching operation to the new cell number. By synchronously counting up the counter of each BBU and each RRH, the switching operation to the new cell number may be performed simultaneously. Synchronously counting up of the counter of CPRISW 6 allows the synchronous switching operation of connection. In this case, each BBU, the CPRISW 6 and each RRH include own counter to count the time before the switching takes place. The following embodiments have the same configuration.

As described above, the management server 2 is capable of changing the operation state of the wireless communication system 1 in accordance with the monitoring result of the EMS.

Figure 4:
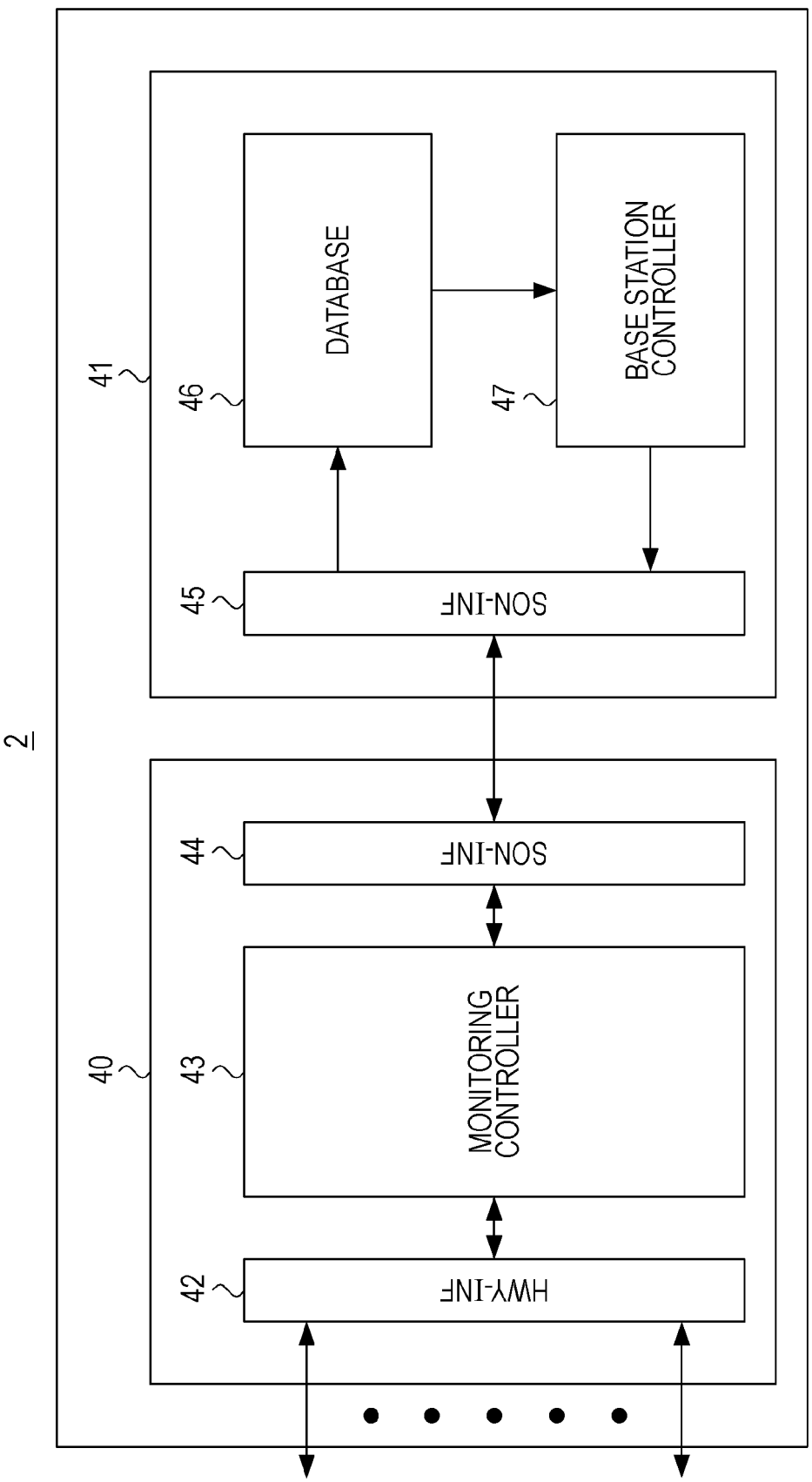
FIG. 4 is a detailed block diagram of a management server.

FIG. 4 is a detailed block diagram of the management server 2. The management server 2 includes an EMS 40 and an SON 41. As described above, the EMS 40 monitors the traffic amount of the wireless communication system 1. The SON 41 outputs a control signal used to change the operation state of each RRH and each BBU which constitute the wireless communication system 1 in accordance with the monitoring result of the EMS 40.

The EMS 40 includes an HWY-INF 42, a monitoring controller 43 and an SON-INF 44. The HWY-INF 42 is an interface for the communication with each BBU. The monitoring controller 43 monitors the traffic information received from the HWY-INF 42. The monitoring controller 43 transmits the monitoring result of the traffic information to the SON-INF 44. The SON-INF 44 is an interface for the communication with SON 41. The SON-INF 44 transmits the monitoring result received from the monitoring controller 43 to the SON 41.

The SON 41 includes a SON-INF 45, a database 46 and a base station controller 47. The SON-INF 45 is an interface for the communication with the EMS 40. The SON-INF 45 receives the monitoring result of the traffic information from the EMS 40. The SON-INF 45 transmits the received monitoring result to the database 46.

The database 46 stores the operation determination table which will be described later. The database 46 determines whether the operation of each BBU and each RRH is to continue or to stop in accordance with the monitoring result and the operation determination table received from the SON-INF 45. Similarly, the database 46 determines the cell number of each BBU in accordance with the monitoring result and the operation determination table. The database 46 outputs the determined operation state and cell number of the BBU and the RRH to the base station controller 47.

The base station controller 47 outputs a control signal of each BBU, the CRPRISW 6, each RRH and each UE to the SON-INF 45 in accordance with the operation state and the cell number of the BBU and the RRH received from the database 46. The control signal is output at the time illustrated in the above-described process flowchart. The SON-INF 45 outputs the received control signal to the EMS 40. The EMS 40 outputs the received control signal to each BBU.

As described above, the management server 2 is capable of controlling the operation state and the cell number to be assigned of each BBU, each RRH and each UE in accordance with the operation state of the wireless communication system 1.

Figure 5:
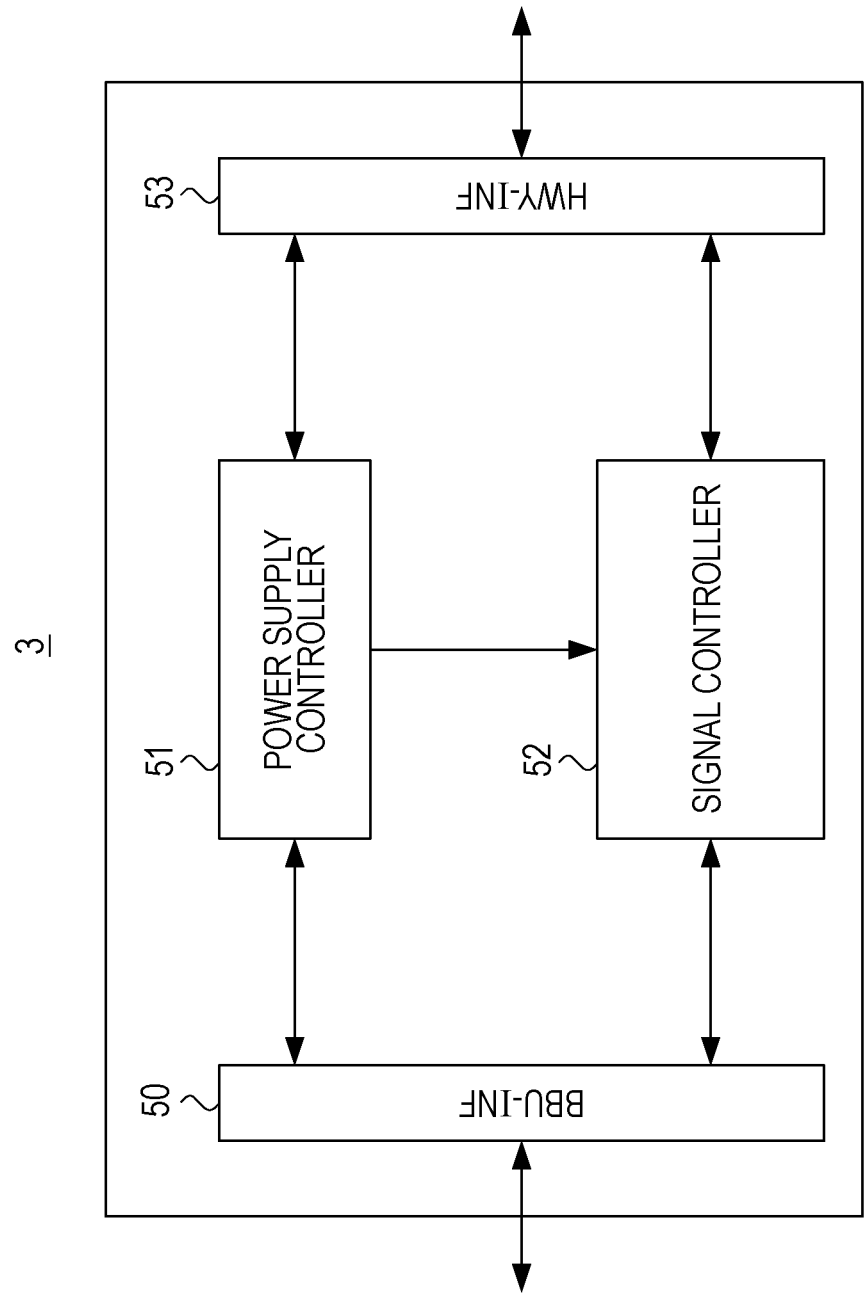
FIG. 5 is a detailed block diagram of a BBU.

FIG. 5 is a detailed block diagram of the BBU 3. BBUs 4 and 5 are the same in function and configuration. Therefore, only the BBU 3 will be described below.

The BBU 3 changes the operational state and the cell number in accordance with the control signal received from the management server 2. The BBU 3 includes a BBU-INF 50, a power supply controller 51, a signal processor 52 and an HWY-INF 53.

The BBU-INF 50 is an interface for the communication with each RRH in accordance with the CPRI standard. In the present embodiment, the BBU 3 is coupled to the CPRISW 6 via the BBU-INF 50. The BBU-INF 50 transmits the signal received from the CPRISW 6 to the power supply controller 51 or to the signal processor 52.

The power supply controller 51 controls the power supply to the signal processor 52 in accordance with the control signal received from the management server 2. The power supply controller 51 stops the power supply to the signal processor 52 when the control signal instructing to stop the operation of the BBU 3 is received. The power supply controller 51 continues the operation even when the power supply to the signal processor 52 is stopped. If the control signal instructing to start the operation of the BBU 3 from the management server 2 is received while the operation of the BBU 3 is stopped, the power supply controller 51 starts the power supply to the signal processor 52.

As described above, even when the operation of the BBU 3 is stopped, an operation request of the BBU 3 from the management server 2 may be responded by letting only the power supply controller 51 which is controllable by the management server 2 operate separately from the BBU 3.

The power supply controller 51 transfers the control signal received from the management server 2 to the BBU-INF 50 if the control signal is not for the BBU 3. The control signal transferred to the BBU-INF 50 is transmitted to each RRH. By transmitting the control signal to the RRH via the power supply controller 51, the management server 2 is capable of transmitting the control signal to each RRH even when the operation of the signal processor 52 is stopped.

The signal processor 52 performs baseband processing, such as modulation and demodulation, of the signals received from each RRH or the management server 2. The signal processor 52 adds the signal other than the information source to the transmitted signal in the wireless signal transmission to each UE. Examples of the signals other than the information source include an error control code and a signal specifying the destination of the communication. The signal processor 52 separates the signal other than the information source about the received signal in the reception of the wireless signal from each UE.

The HWY-INF 53 is an interface for the communication with the management server 2. The HWY-INF 53 transmits the control signal received from the management server 2 to the power supply controller 51. The HWY-INF 53 transmits the signal received from the management server 2 to the signal processor 52. The HWY-INF 53 transmits the control result received from the power supply controller 51 to the management server 2. The HWY-INF 53 transmits the signal received from the signal processor 52 to the management server 2.

In the present embodiment, a single BBU is capable of executing data communication with three RRHs. A single BBU may have three configurations which is illustrated in FIG. 5 in the same device, or may have three signal processors 52.

With the configuration described above, the BBU 3 is capable of continuing or stopping the power supply to the signal processor 52 in accordance with the control signal received from the management server 2.

Figure 6:
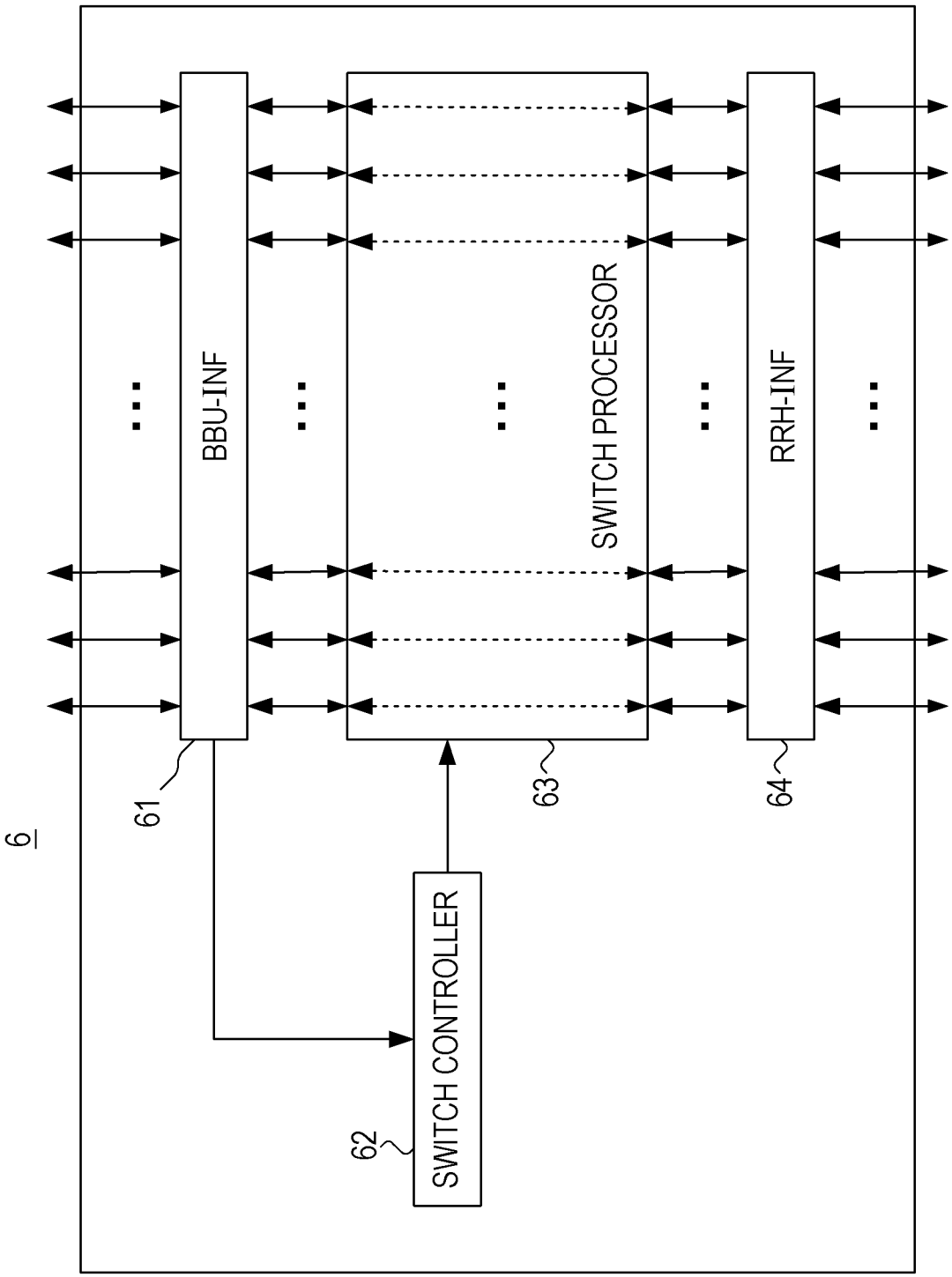
FIG. 6 is a detailed block diagram of a CPRISW.

FIG. 6 is a detailed block diagram of the CPRISW 6. The CPRISW 6 switches the relation of connection of each BBU and each RRH in accordance with the control signal received from the management server 2. The CPRISW 6 includes a BBU-INF 61, a switch controller 62, a switch processor 63 and an RRH-INF 64.

The BBU-INF 61 is an interface for the communication with each BBU. The BBU-INF 61 transmits the control signal received from each BBU to the switch controller 62. The BBU-INF 61 transmits the signal received from each BBU to the switch processor 63. The BBU-INF 61 transmits the signal received from the switch processor 63 to each BBU.

The switch controller 62 switches the relation of connection of the switch processor 63 in accordance with the received control signal. The switch processor 63 switches the relation of connection of the BBU-INF 61 and the RRH-INF 64 in accordance with the switching signal received from the switch controller 62. Details of the switching operation of the switch processor 63 will be described later.

The RRH-INF is an interface for the communication with each RRH. The RRH-INF 64 transmits the signal received from the switch processor 63 to each RRH. The RRH-INF 64 transmits the signal received from each RRH to the switch processor 63. The BBU-INF 61 transmits the signal received from the switch processor 63 to each BBU. Details of the switching operation of the CPRISW 6 illustrated in FIG. 6 will be described later.

Figure 7:
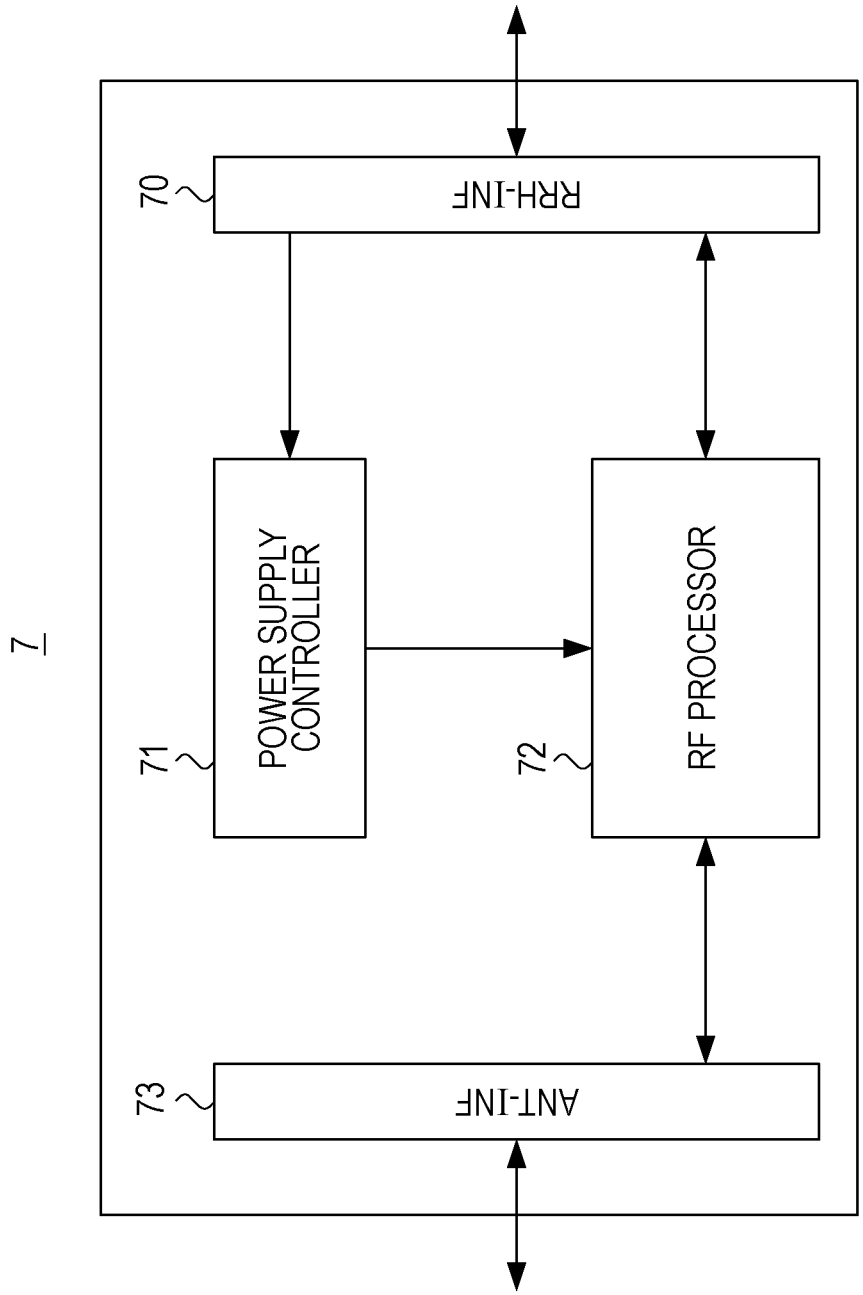
FIG. 7 is a detailed block diagram of an RRH.

FIG. 7 is a detailed block diagram of the RRH 7. RRHs 8 to 15 are the same in function and configuration. Therefore, only the RRH 7 will be described below.

The RRH 7 changes the operational state and the cell number in accordance with the control signal received from the management server 2. The RRH 7 includes an RRH-INF 70, a power supply controller 71, a radio frequency (RF) processor 72 and an ANT-INF 73.

The RRH-INF 70 is an interface for the communication with each BBU in accordance with the CPRI standard. In the present embodiment, the RRH 7 is coupled to the CPRISW 6 via the RRH-INF 70. The RRH-INF 70 transmits the signal received from the CPRISW 6 to the power supply controller 71 or to the RF processor 72.

The power supply controller 71 controls the power supply to the RF processor 72 in accordance with the control signal received from the management server 2. The power supply controller 71 stops the power supply to the RF processor 72 when the control signal instructing to stop the operation of the RRH 7 is received. The power supply controller 71 continues the operation even when the power supply to the RF processor 72 is stopped. If the control signal instructing to start the operation of the RRH 7 from the management server 2 is received while the operation of the RRH 7 is stopped, the power supply controller 71 starts the power supply to the RF processor 72. As described above, even when the operation of the RRH 7 is stopped, power consumption when the operation of the RRH 7 is stopped in a state controllable by the management server 2 by letting only the power supply controller 71 which is to be controlled by the management server 2 operate may be reduced.

The RF processor 72 performs RF processing of the signal received from each UE or any of the BBUs. During the wireless signal transmission to each UE, the RF processor 72 converts the carrier frequency of the information source received from the BBU from the baseband region into the RF region. The frequency band of the RF region is determined in accordance with the cell number assigned to the RRH 7. The RF processor 72 transmits the information source converted into the RF region to each UE as a radio wave. During the wireless signal reception from each UE, the RF processor 72 converts the carrier frequency of the information source received from each UE from the RF region into the baseband region. The RF processor 72 transmits the information source which has been converted into the baseband region to any of the BBUs via a cable.

The ANT-INF 73 is an interface for the wireless communication with each UE. The ANT-INF 73 transmits the information source received from the RF processor 72 to an antenna. The ANT-INF 73 transmits the information source received from the antenna to the RF processor 72.

FIGS. 8A and 8B are correspondence tables of the number of UEs performing wireless communication and the cell numbers assigned to each RRH and each BBU. FIGS. 8A and 8B are illustrative and are not restrictive. The database 46 of the management server 2 stores the correspondence table illustrated in FIGS. 8A and 8B as a part of the operation determination table. FIG. 8A is a table 80 for the reference of the cell numbers assigned to each RRH in accordance with the number of UEs performing wireless communication. FIG. 8B is a table 81 for the reference of the cell numbers assigned to each BBU in accordance with the number of UEs performing wireless communication.

In the present embodiment, the management server 2 changes the cell number assigned to each RRH in accordance with the number of UEs performing wireless communication and with the traffic amount. By assigning the same cell number to a plurality of RRHs, the RRHs may be assigned to a single BBU. Therefore, the management server 2 is capable of reducing the number of operating BBUs. The reduced number of operating BBUs allows the management server 2 to reduce power consumption of the wireless communication system 1. By assigning the same cell number to a plurality of RRHs, the cell area covered by a single cell may be enlarged. The enlarged cell area allows the reduction of the number of handovers accompanying the movement of the UE. The reduced number of handovers allows the lessening of the process load relating to the wireless communication system 1.

The table 80 illustrated in FIG. 8A is stored in the database 46 of the management server 2. The rows of the table 80 represent the cell numbers to be assigned to the RRHs in accordance with the number of UEs under communication. The row 82 represents the thresholds used to determine whether the number of UEs is large, medium or small. The thresholds are set in advance in accordance with the throughput of each RRH, the cell size and other factors. The row 83 represents the cell number assigned to the RRH 7 in accordance with the number of UEs under communication. For example, the RRH 7 in the present embodiment always has the cell number '1' regardless of the number of UEs. The row 91 represents the cell number assigned to the RRH 15 in accordance with the number of UEs under communication. The RRH 15 has the cell number '9' when the number of UEs is large, '3' when the number of UEs is medium and '1' when the number of UEs is small.

The columns of the table 80 represent the cell numbers assigned to the RRHs among the number of UEs under communication. The column 92 represents the cell numbers assigned to the RRHs when the number of UEs is large. Different cell numbers, namely '1' to '9,' are assigned to the RRHs.

The column 93 of the table 80 represents the cell number assigned to the RRHs when the number of UEs is medium. The cell number '1' is assigned to the RRHs 7, 8 and 9, the cell number '2' is assigned to the RRHs 10, 11 and 12 and the cell number '3' is assigned to the RRHs 13, 14 and 15. The same cell number may be assigned to a plurality of RRHs when the cell number is assigned such that the number of UEs existing in the area to which a single cell number has been assigned does not exceed the number of UEs processable by a single BBU.

The column 94 of the table 80 represents the cell numbers assigned to the RRHs when the number of UEs is small. The cell number '1' is assigned to all the RRHs. Like the column 93, the same cell number may be assigned to the larger number of RRHs when the cell number is assigned such that the number of UEs existing in the area to which a single cell number has been assigned does not exceed the number of UEs processable by a single BBU.

By assigning the same cell number to a plurality of RRHs in accordance with the number of UEs as described above, the cell area covered by a single cell may be enlarged. The enlarged cell area allows the reduction of the number of handovers accompanying the movement of the UE. The reduced number of handovers allows to lessen the process load relating to the wireless communication system 1.

The table 81 illustrated in FIG. 8B is stored in the database 46 of the management server 2. The rows of the table 81 represent the cell numbers to be assigned to the BBUs in accordance with the number of UEs under communication and the operational states. In the present embodiment, three units which perform data communication with the RRHs are mounted on a single BBU. A single BBU is capable of performing data communication with up to three RRHs. For example, the units mounted on the BBU 3 are called a BBU 3-1, a BBU 3-2 and a BBU 3-3.

The rows 95 of the table 81 represent the thresholds used to determine whether the number of UEs is large, medium or small. The thresholds are set in advance in accordance with the throughput of each RRH, the cell size and other factors. The thresholds in the row 95 are the same as those in the row 82. The row 96 represents the cell number assigned to the BBU 3-1 in accordance with the number of UEs under communication. For example, the BBU 3-1 always has the cell number of '1' regardless of the number of UEs; this means that the BBU 3-1 is always operating. The row 104 represents the cell number assigned to the BBU 5-3 in accordance with the number of UEs under communication. The BBU 5-3 has the cell number of '9' when the number of UEs is large; this means that the BBU 5-3 stops the operation when the number of UEs is medium or smaller.

The columns of the table 81 represent the cell numbers assigned to the BBUs among the number of UEs under communication and the operational states. The column 105 represents the cell numbers assigned to the BBUs when the number of UEs is large and the operational states. Different cell numbers, namely '1' to '9,' are assigned to the BBUs.

The column 106 of the table 81 represents the cell number assigned to the BBUs when the number of UEs is medium. The cell number '1' is assigned to the BBU 3-1, the cell number '2' is assigned to BBU 3-2 and the cell number '3' is assigned to the BBU 3-3. Operations of the BBUs 4 and 5 are stopped. As described above, the same cell number is assigned to the three RRHs when the number of UEs is medium in the table 81. A single BBU is capable of processing the baseband processing of the data output from the three RRHs to which the same cell number has been assigned. The number of the cell numbers becomes small as the same cell number is assigned to the larger number of RRHs. Therefore, the number of BBUs which are to be operated may be reduced.

The column 107 of the table 81 represents the cell number assigned to the BBUs when the number of UEs is small. The cell number '1' is assigned to the BBU 3-1. The table 80 shows that the cell number '1' is assigned to all the RRHs when the number of UEs is small. Therefore, it is possible to let only the BBU 3-1 operate and let the rest of the BBUs stop when the number of UEs is small.

As described above, the number of operating BBUs may be changed by the change of the number of RRHs to which the same cell number is assigned as the number of UEs performing data communication changes. The change in the number of operating BBUs may optimize power consumption of the entire wireless communication system 1 in accordance with the traffic amount of data.

FIGS. 9A to 9C are tables illustrating the relation of connection of each BBU and each RRH in accordance with the number of UEs. FIG. 9A is a table 110 illustrating the relation of connection of the BBUs and the RRHs when the number of UEs is large. FIG. 9B is a table 111 illustrating the relation of connection of the BBUs and the RRHs when the number of UEs is medium. FIG. 9C is a table 112 illustrating the relation of connection of the BBUs and the RRHs when the number of UEs is small. The tables 110, 111 and 112 are stored in the database 46 of the management server 2. The switch controller 62 of the CPRISW 6 described above retrieves either of the table 110, 111 or 112 in accordance with the number of UEs. The switch controller 62 switches the relation of connection of the switch processor 63 in accordance with the retrieved table.

In FIG. 9A, the white circles in the table 110 represent the relation of connection of each RRH and each BBU. The white circles work in the same way in the tables 111 and 112. For example, a white circle exists in the column of RRH 7 and the row of the BBU 3-1. Therefore, the switch controller 62 refers to the table 110 to control the switch processor 63 such that the RRH 7 and the BBU 3-1 are coupled when the number of UEs is large. Connections between other BBUs and RRHs are made in the similar manner.

In FIG. 9B, white circles exist in the row of BBU 3-1 of table 111 at the columns of RRHs 7, 8 and 9. Therefore, the switch controller 62 refers to the table 111 to control the switch processor 63 such that the RRHs 7, 8 and 9 and the BBU 3-1 are coupled when the number of UEs is medium. Connections regarding the rows of BBU 3-2 and the BBU 3-3 are made in the same manner.

The column of 'addition' of table 111 represent the set of RRHs which are added and transmitted to each of the BBUs when the data is transmitted from the RRHs to the BBUs. For example, the row of the BBU 3-1 in the column of 'addition' is filled with 'RRHs 7, 8 and 9'. Therefore, when the data is transmitted to the BBU 3-1 from the RRH, the switch controller 62 controls the switch processor 63 to add the data output from each of the RRHs 7, 8 and 9. The switch processor 63 transmits the added result to the BBU 3-1. Connections regarding the rows of BBU 3-2 and the BBU 3-3 are made in the same manner. Power supply to the BBUs which are coupled with no RRHs may be stopped.

In FIG. 9C, white circles exist in all the rows of the BBU 3-1 of the table 112 at the columns of all the RRHs. Therefore, the switch controller 62 refers to the table 112 to control the switch processor 63 such that the RRHs 7, 8 and 9 and the BBU 3-1 are coupled when the number of UEs is small. Power supply to the BBUs which are coupled with no RRHs may be stopped.

The column of 'addition' in the table 112 represents a set of RRHs which are added and transmitted to each BBU when the data is transmitted from the RRH to the BBU. The row of BBU 3-1 of the column of 'addition' is filled with 'total addition'. Therefore, when data is transmitted to the BBU 3-1 from the RRH, the switch controller 62 controls the switch processor 63 to add the data output from all the RRHs. The switch processor 63 transmits the added result to the BBU 3-1.

As described above, the CPRISW 6 is capable of switching connections suitably in accordance with the operational state of the BBU and the RRH with reference to the tables 110, 111 and 112 in accordance with the number of UEs.

Figure 10A:
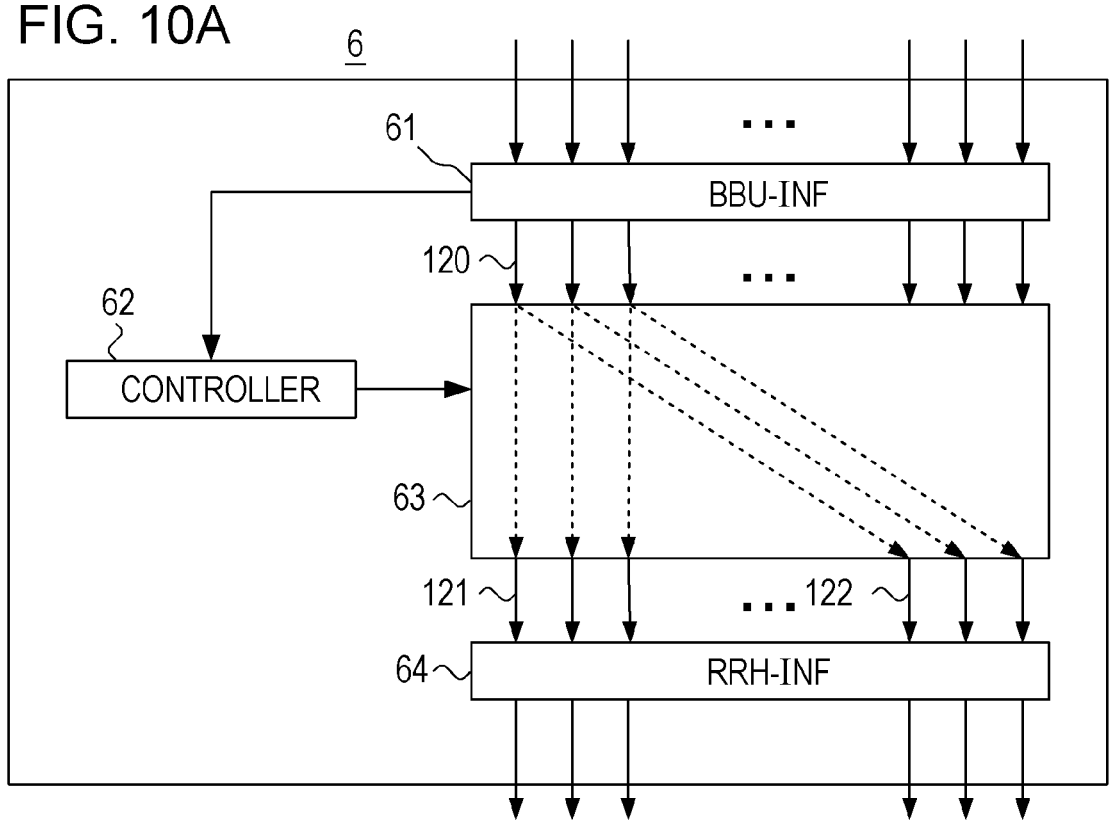
FIGS. 10A and 10B are schematic diagrams of an operation of the CPRISW in which a single BBU is coupled to a plurality of RRHs.
Figure 10B:
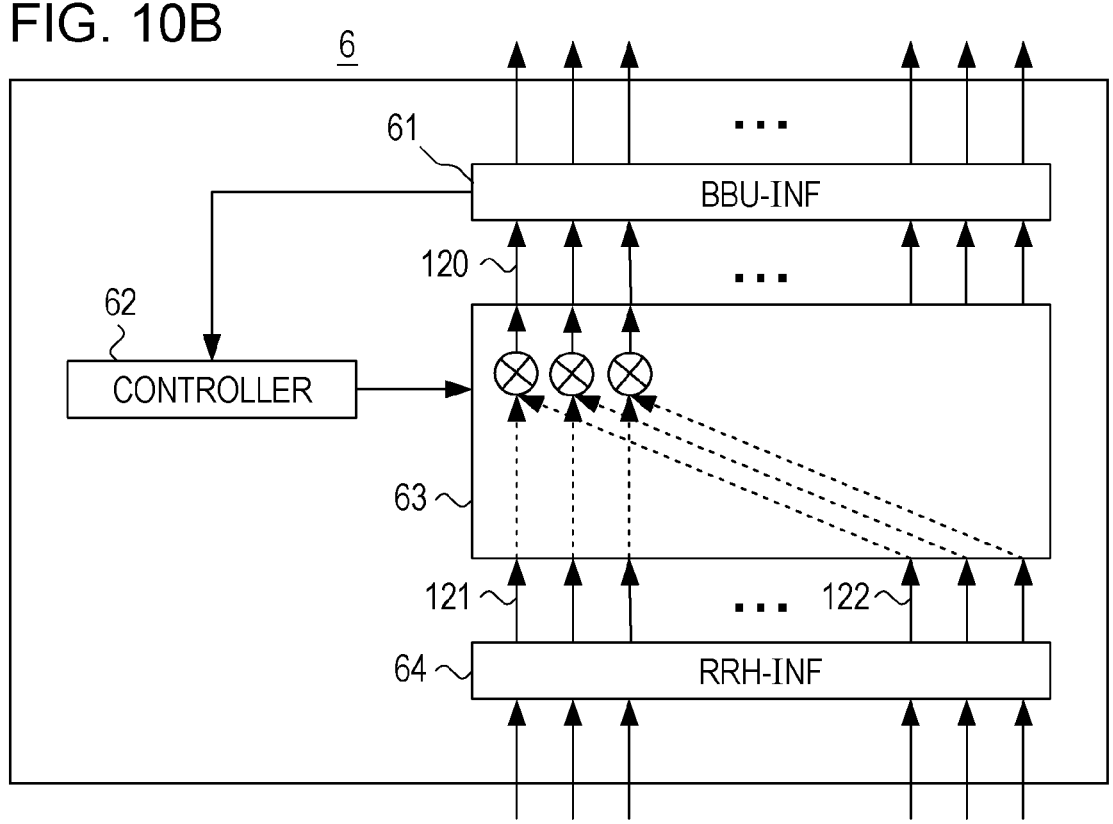

FIGS. 10A and 10B are schematic diagrams of an operation of the CPRISW 6 in which a single BBU is coupled to the RRHs. FIG. 10A is a schematic diagram of the operation of the CPRISW 6 during data transmission from the BBU to the RRH. FIG. 10B is a schematic diagram of the operation of the CPRISW 6 during data transmission from the RRH to the BBU.

The switch controller 62 illustrated in FIG. 10A controls the switch processor 63 to connect a port of a signal 120, a port of a signal 121 and a port of a signal 120 and a port of a signal 122. The switch processor 63 reproduces the received signal 120 and outputs the signal 120 as the signals 121 and 122. The output signals 121 and 122 are separately input to the RRHs. The RRHs which receive the signals 121 and 122 have the same cell number. Each RRH receives the same signal from the BBU. If the UE exists in an area covered by any of the RRHs, the UE is capable of receiving the signal transmitted from the BBU.

The switch controller 62 illustrated in FIG. 10B controls the switch processor 63 to add the signal 121 to the signal 122 and then output the signal 120. The signals 121 and 122 are output from the RRH which covers adjoining cells. The RRHs which output the signals 121 and 122 have the same cell number assigned thereto. Therefore, if the UE, which exists in an area covered by any of the RRHs, the BBU is capable of receiving the signal transmitted from the UE. Since RRHs have the cell number assigned thereto, communication may be continued without the need of handover if the UE enters an area covered by a different RRH. If the UE exists near a boundary of adjacent cover areas of the RRHs to which the same cell number is assigned, the signal 121 and the signal 122 are of substantially the same phase and thereby the switch processor 63 is capable of add and amplify the signals 121 and 122, and then output the signal 120. The addition and amplification increases the amplitude and therefore the BBU is capable of decreasing the error rate of the signal being received.

Figure 11:
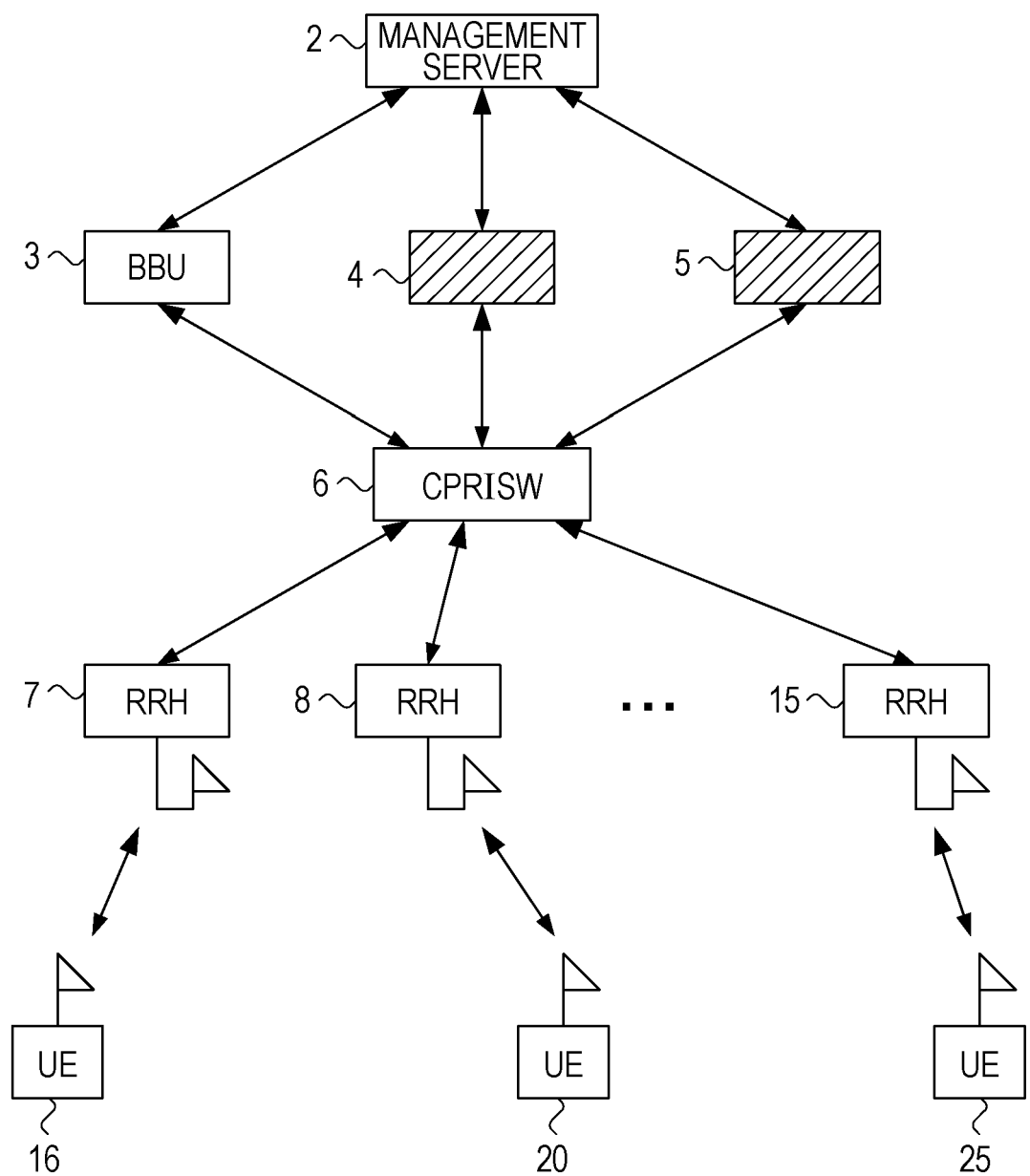
FIG. 11 is a block diagram illustrating an operation of the wireless communication system in which the number of UEs communicating with each RRH is small.

FIG. 11 is a block diagram illustrating an operation of the wireless communication system 1 in which the number of UEs communicating with each RRH is small. As illustrated in FIG. 11, the RRH 7 communicates only with the UE 16. An RRH 8 communicates only with the UE 20. An RRH 15 communicates only with the UE 25. If the number of UEs communicating with each RRH decreases and the number of UEs is medium or smaller, power supply to the BBUs 4 and 5 is stopped. The hatching in FIG. 11 represents that the power supply to the BBUs 4 and 5 is stopped.

FIG. 12 is a process flowchart illustrating a shift from a state in which the operation control is stopped to a state in which the operation control is executed. The state in which the operation control is stopped refers to a state in which all the devices of the wireless communication system 1 are operating without any operation control. The state in which the operation control is executed refers to a state in which the operation of each device is controlled to continue or stop in accordance with the operational state of the wireless communication system 1.

In the present embodiment, a process to stop some BBUs will be described. Step S20 represents that all the RRHs and BBUs are operating. If the number of UEs under communication in the wireless communication system 1 decreases, the information indicating the decrease is notified to the management server 2 (S21). The management server 2 starts the operation control in accordance with the number of UEs (S22).

The management server 2 notifies the cell number after the connection change to each BBU (S23). The management server 2 notifies the cell number after the connection change to each UE via the BBU (S24). Each UE changes the cell number autonomously by the execution of a compulsory handover after a certain period of time elapsed. Previous notification allows each UE to start the handover to a new cell number before the switching operation of the operational state of each BBU and each RRH is performed.

The management server 2 transmits the switching signal to the CPRISW 6 for the instruction of the switching operation of connection (S25). The CPRISW 6 performs switching operation of connection simultaneously with the cell number change notification which will be described later in accordance with the switching signal received from the management server 2.

The management server 2 outputs a control signal for the instruction to operate or to stop each BBU in accordance with the determination in step S22 (S26). Each BBU which received the control signal determines to operate or to stop in accordance with the control signal.

After a certain period of time elapsed since the changed cell numbers are notified to each BBU and each UE, the management server 2 outputs a cell number change notification signal to each BBU and each RRH (S27). After a certain period of time elapsed since the notification of the cell numbers in step S23, the new cell number is assigned to each UE and, at the same time, the new cell numbers are assigned to each BBU and each RRH which received the cell number change notification signal (S28). The CPRISW 6 switches the connection. Each BBU and each RRH operate or stop in accordance with the control signal.

As described above, the management server 2 switches the relation of connection of the BBU and the RRH in accordance with the decrease in the number of UEs. The management server 2 is capable of reducing the power consumption of the entire wireless communication system 1 by stopping the power supply to the BBUs which are unnecessary as a result of the switching operation of the relation of connection.

Figure 13B:
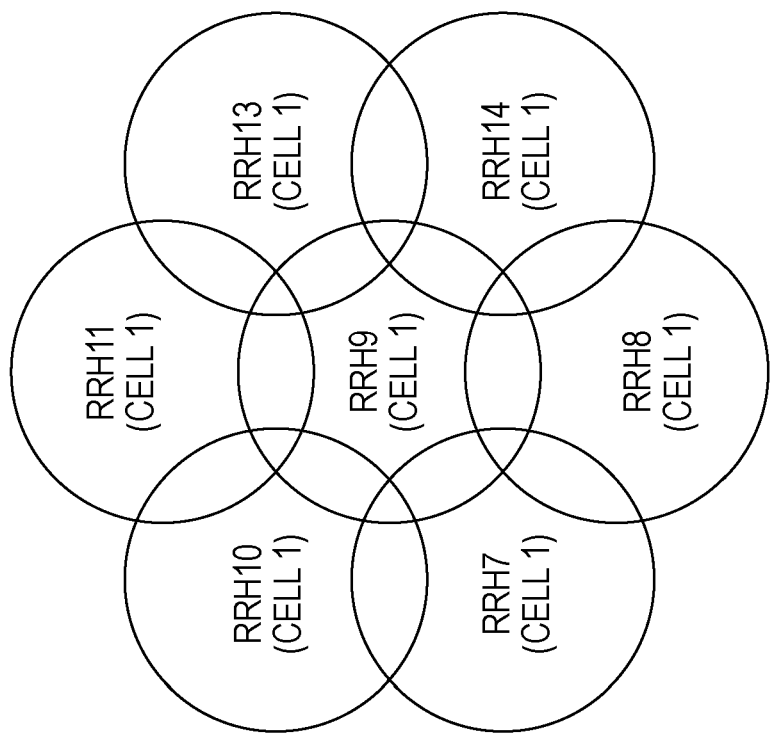
FIGS. 13A and 13B are schematic diagrams of cell ranges covered by each of the RRHs and the cell numbers assigned to the cells.
Figure 13A:
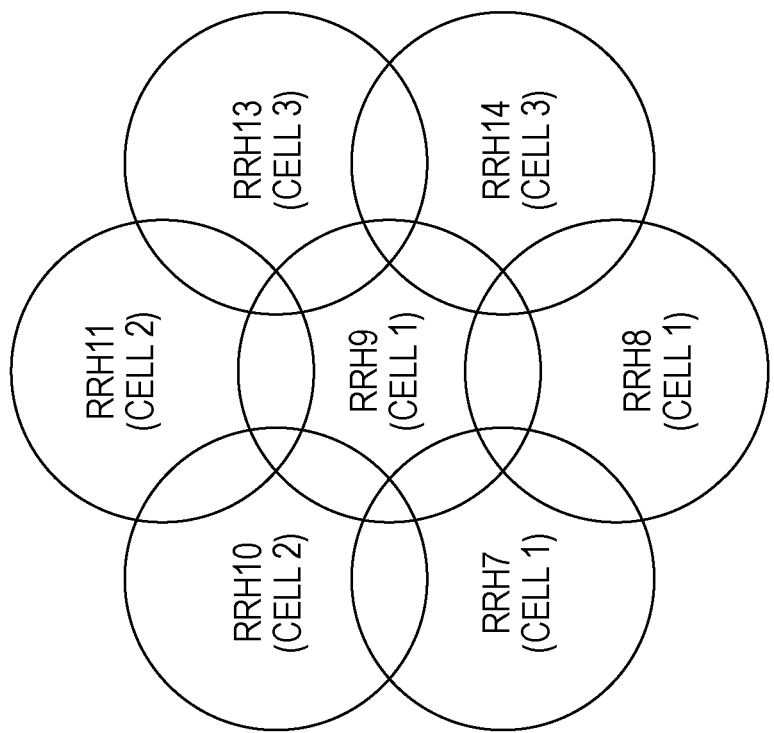

FIGS. 13A and 13B are schematic diagrams of cell ranges covered by each of the RRHs and the cell numbers assigned to the cells. FIG. 13A is a schematic diagram of the cell numbers when the number of UEs is medium. FIG. 13B is a schematic diagram of the cell numbers when the number of UEs is small.

As illustrated in FIG. 13A, the cell ranges covered by the RRHs 7, 8 and 9 are adjacent to one another. The cell number assigned to the RRHs 7, 8 and 9 is 1. Therefore, the wireless communication system 1 is capable of enlarging the cell range covered by a single cell number by assigning the same cell number to three RRHs as compared with a case in which an individual cell number is assigned to each RRH. The enlarged cell range covered by a single cell number may reduce the number of handovers due to the change in cell number accompanying the movement of the UE. This is also possible in the RRHs 10 and 11 to which the cell number '2' is assigned and the RRHs 13 and 14 to which the cell number '3' is assigned.

As illustrated in FIG. 13B, the same cell number '1' is assigned to the cell range covered by all the RRHs when the number of UEs is small. Therefore, the cell range covered by the same cell number is larger than the cell range when the number of UEs is medium. The larger the cell range covered by the same cell number, the smaller the change rate of the cell number accompanying the movement of the UE. The smaller change rate of the cell number produces the load which is smaller than that accompanying the handover in the wireless communication system 1.

The baseband processing in the wireless communication with the UEs to which the same cell number is assigned may be processed by a single BBU. Therefore, when the number of UEs is small, the baseband processing in the wireless communication with all the UEs covered by the wireless communication system 1 may be performed by a single BBU. The wireless communication system 1 is capable of reducing the power consumption by decreasing the number of BBUs necessary for the process and stopping the power supply to the unnecessary BBUs.

Figure 14:
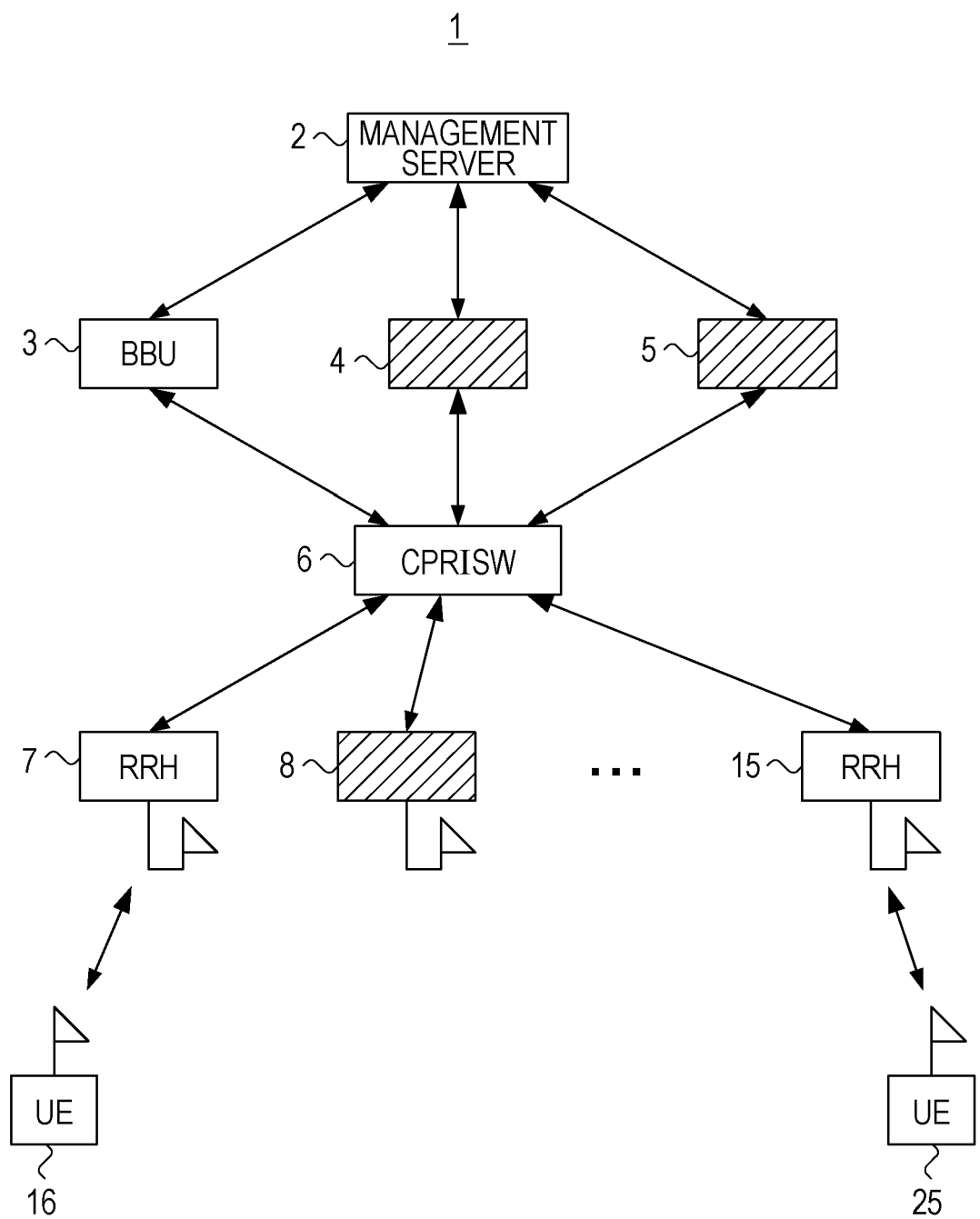
FIG. 14 is a block diagram illustrating an operation of the wireless communication system in which no UE exists in a cell range covered by an RRH.

FIG. 14 is a block diagram illustrating an operation of the wireless communication system when no UE exists in a cell range covered by an RRH. As illustrated in FIG. 14, the RRH 7 communicates only with the UE 16. An RRH 8 communicates with no UEs. An RRH 15 communicates only with the UE 25. If no UEs exist in the cell range covered by the RRH 8, the operation of the RRH 8 is stopped for the decrease in the power consumption. In the present embodiment, the operation of the BBUs 4 and 5 is stopped when the number of UEs communicating with each RRH decreases and the number of UEs is medium or smaller. The hatching in FIG. 14 represents that the operation of the BBUs 4 and 5 and the RRH 8 is stopped.

FIG. 15 is a process flowchart illustrating a shift from a state in which the operation control is stopped to a state in which the operation control is executed. In the present embodiment, a process to stop the BBU and the RRH will be described. Step S30 represents that all the RRHs and BBUs are operating. If the number of UEs under communication in the wireless communication system 1 decreases, the information indicating the decrease is notified to the management server 2 (S31). The management server 2 starts the operation control in accordance with the number of UEs. The management server 2 determines whether the operation of the BBU and the RRH is to continue or to stop (S32). The management server 2 determines the cell numbers to be assigned to each BBU, each RRH and each UE after the operation control.

The management server 2 notifies the determined cell number to each BBU (S33). The management server 2 notifies determined cell number to each UE via the BBU (S34). Each UE changes the cell number autonomously by the execution of a compulsory handover after a certain period of time elapsed. Previous notification allows each UE to start the handover to a new cell number before the switching operation of the operational state of each BBU and each RRH is performed.

The management server 2 transmits, to the CPRISW 6, a switching signal used for the switching of each RRH which is the connection destination of each BBU in accordance with determination result in step S32 (S35). The CPRISW 6 performs switching operation of connection simultaneously with the cell number change notification which will be described later in accordance with the switching signal received from the management server 2.

The management server 2 outputs a control signal for the instruction to operate or to stop each BBU in accordance with the determination in step S32 (S36). Each BBU which received the control signal determines to operate or to stop in accordance with the control signal. The management server 2 outputs a control signal for the instruction to operate or to stop each RRH in accordance with the determination in step S32 (S37). Each RRH which received the control signal determines to operate or to stop in accordance with the control signal.

After a certain period of time elapsed since the changed cell numbers are notified to each BBU and each UE, the management server 2 outputs cell number change notification signal to each BBU and each RRH (S38). After a certain period of time elapsed since the notification of the cell numbers in step S33, the new cell number is assigned to each UE and, at the same time, the new cell numbers are assigned to each BBU and each RRH which received the cell number change notification signal (S39). At the same time, the CPRISW 6 switches the connection. Each BBU and each RRH continue or stop the operation in accordance with the control signal.

As described above, the management server 2 switches the relation of connection of the BBU and the RRH in accordance with the decrease in the number of UEs. The management server 2 is capable of reducing the power consumption of the entire wireless communication system 1 by stopping the power supply to the BBUs and RRHs which are unnecessary as a result of the switching of the relation of connection.

Figure 16B:
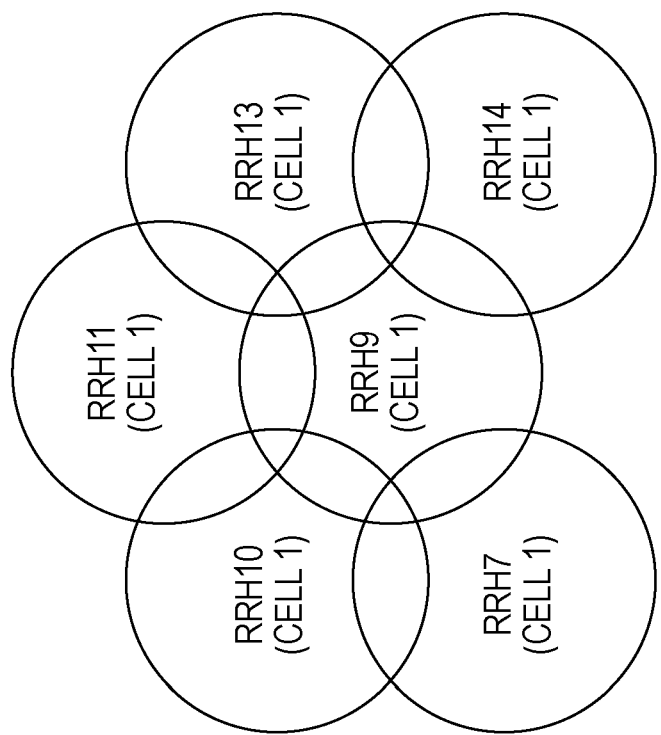
FIGS. 16A and 16B are schematic diagrams of cell ranges covered by each RRH, and the cell number assigned to each cell.
Figure 16A:
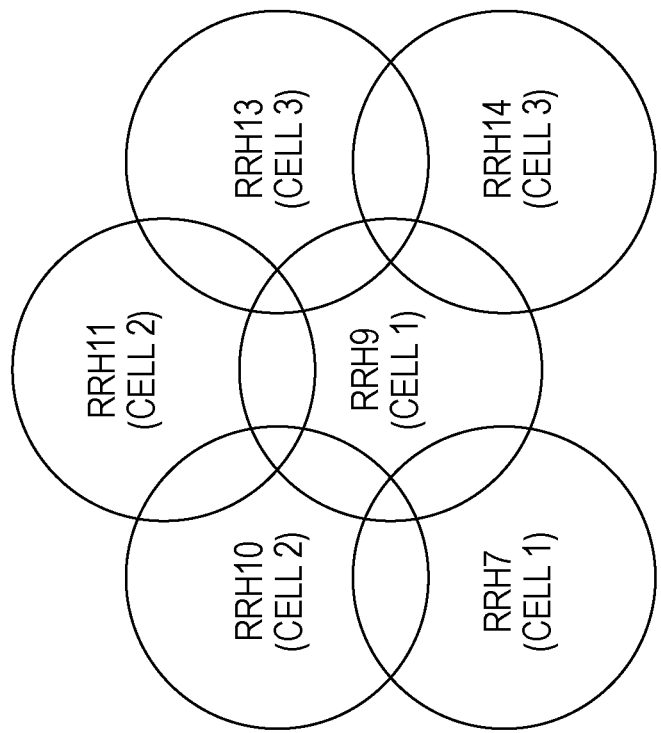

FIGS. 16A and 16B are schematic diagrams of cell ranges covered by each of the RRHs and the cell numbers assigned to the cells. FIG. 16A is a schematic diagram of the cell numbers when the number of UEs is medium. FIG. 16B is a schematic diagram of the cell numbers when the number of UEs is small.

FIG. 16A illustrates the cell ranges illustrated in FIG. 13A when power supply to the RRH 8 is stopped. FIG. 16B illustrates the cell ranges illustrated in FIG. 13B when power supply to the RRH 8 is stopped. The RRHs other than the RRH 8 are operating. Since the operation condition of the RRHs other than the RRH 8 is the same as that described with reference to FIG. 13A, description thereof will be omitted.

As described above, stopping the power supply to the RRH which covers a single cell range does not affect the cell ranges covered by other RRHs; and therefore, the cell numbers may be changed in accordance with the number of UEs under communication. The wireless communication system 1 is capable of further reducing the power consumption by decreasing the number of BBUs necessary for the process and stopping the power supply to the unnecessary BBUs and, at the same time, by stopping the power supply to the RRHs which are not in communication with the UEs.

Figure 17A:
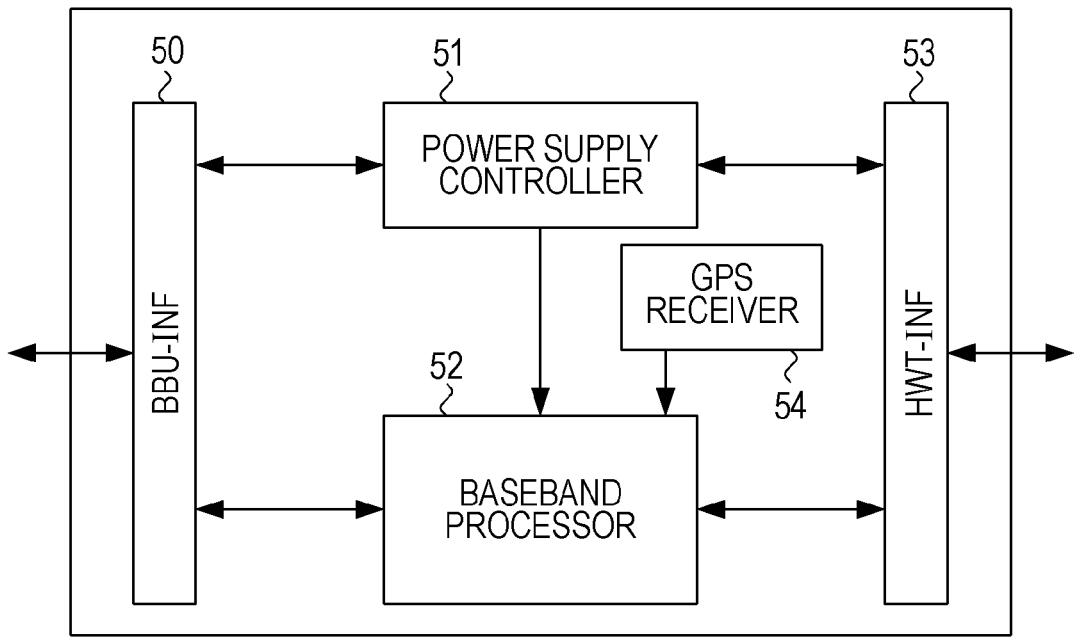
FIGS. 17A and 17B are detailed block diagrams of a device in which a global positioning system (GPS) is used in the wireless communication system.
Figure 17B:
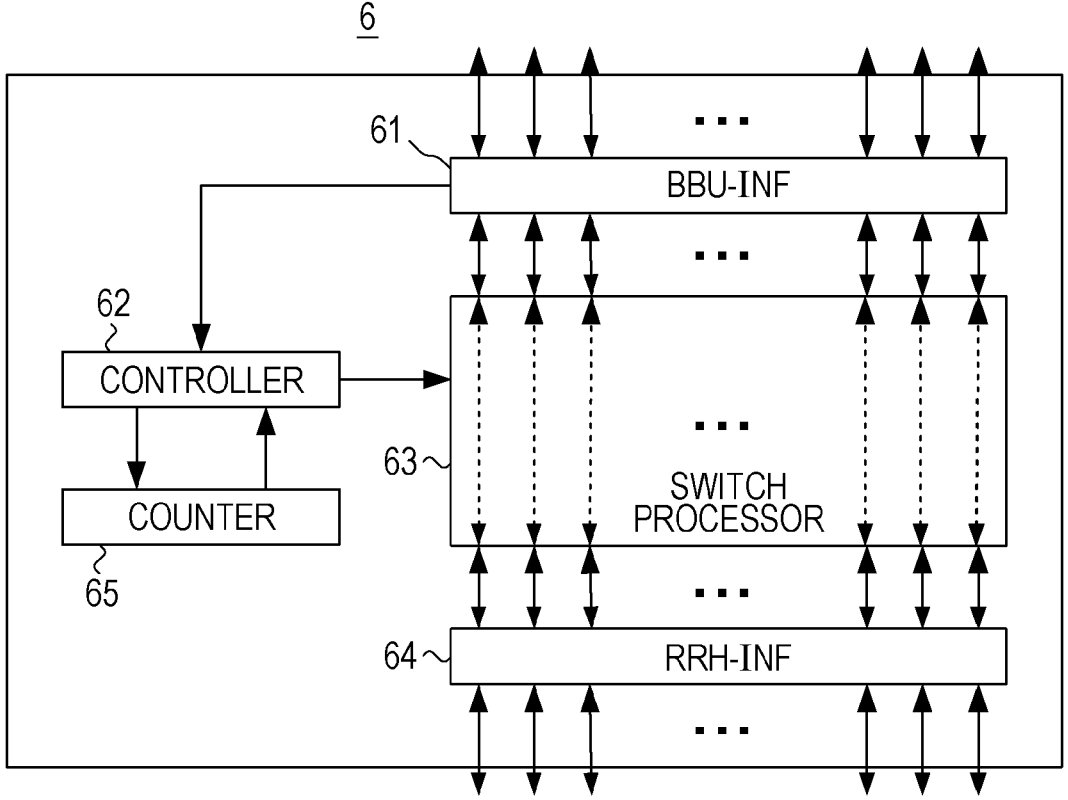

FIGS. 17A and 17B are detailed block diagrams of a device when a global positioning system (GPS) is used in the wireless communication system 1. FIG. 17A is a detailed block diagram of the BBU 3 when the GPS is used. FIG. 17B is a detailed block diagram of the CPRISW 6 when the GPS is used.

The configuration illustrated in FIG. 17A includes a GPS receiver 54 which is added to the BBU 3 illustrated in FIG. 5. The GPS receiver 54 generates reference clocks in accordance with a received GPS signal. The signal processor 52 operates in accordance with the reference clocks generated by the GPS receiver 54.

The wireless communication system 1 includes the BBUs. The BBUs operate asynchronously. When a single UE moves from a cell range managed by a certain BBU to a cell range managed by another BBU, handover occurs accompanying the change of the cell number. Asynchronous operation of the BBUs may cause interruption of data communication due to asynchronous operation timing of the BBUs during the handover. In the present embodiment, the GPS receiver 54 mounted on each BBU may synchronize the operation of the BBUs. The synchronized operation of the BBUs may prevent interruption of data communication during the handover.

The configuration illustrated in FIG. 17B includes a counter 65 which is added to the CPRISW 6 illustrated in FIG. 6. A switch control signal which the switch controller 62 receives includes information about frame numbers for the time of switching operation. The switch controller 62 calculates count values in accordance with the difference between the frame numbers at the time of receiving the switch control signal and the frame numbers at the time of switching. The switch controller 62 transmits the calculated count values to the counter 65.

The counter 65 starts counting up upon reception of the count values. The counter 65 transmits a notification signal to the switch controller 62 when the counted-up value exceeds the received count value. The switch controller 62 which received the notification signal starts the switching with respect to the switch processor 63.

As described above, the CPRISW 6 is capable of accurately performing the switching operation at the time of switching designated by the management server 2 by using the counter 65. Synchronous operation of the BBU which is a switch source and the BBU which is a switch destination achieved by the GPS receiver 54 may prevent instantaneous interruption of data communication accompanying the switching operation.

The counter is used for the adjustment of the time of switching of the CPRISW 6 in the present embodiment; however, the following configuration is also possible: information about the frame numbers at the time of switching is stored in the switch controller 62 and the switching operation is started when the frame numbers received by the switch controller 62 exceed the frame numbers stored in the switch controller 62.

Figure 18:
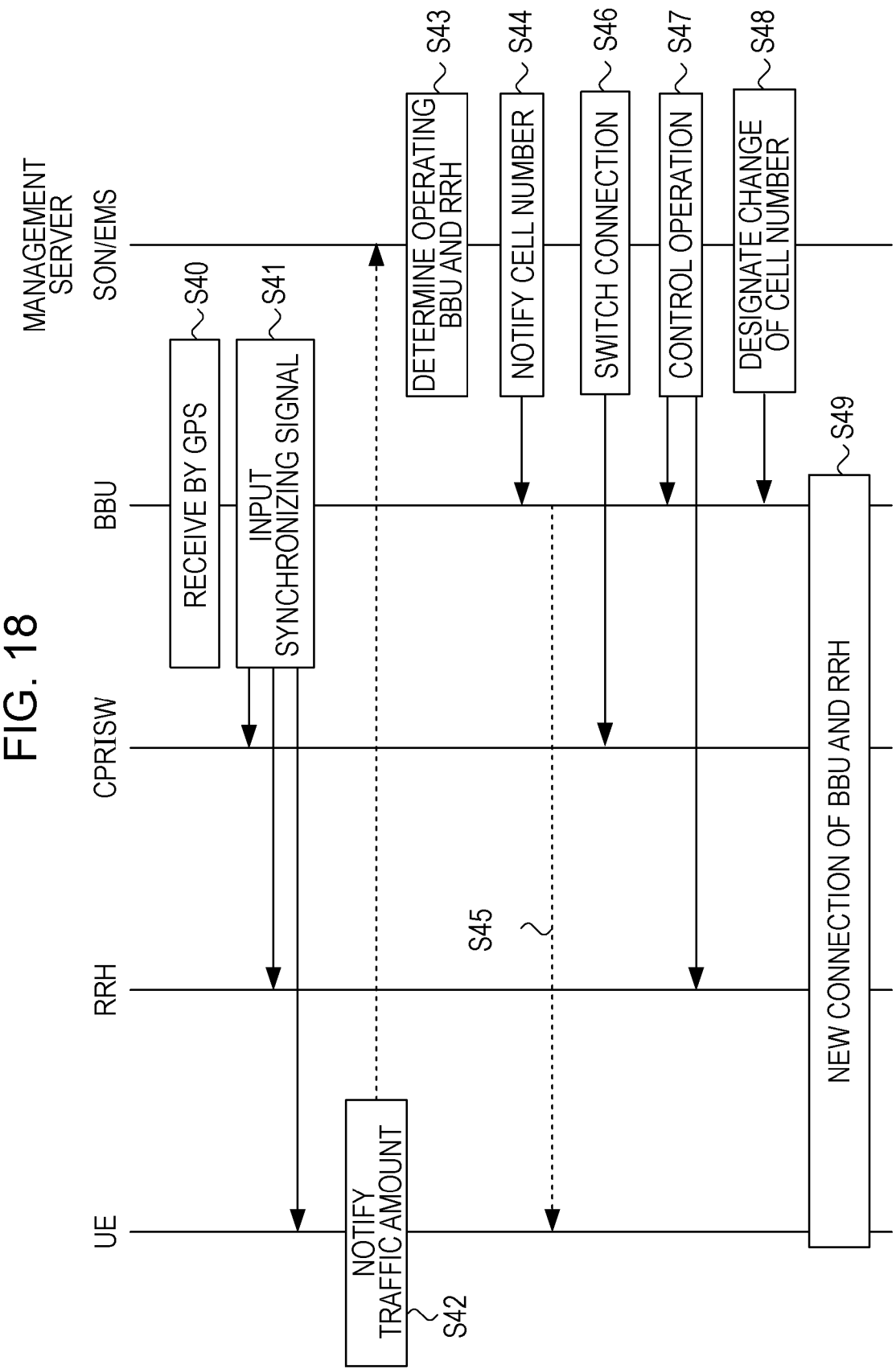
FIG. 18 is a process flowchart of the operation control in consideration of synchronization by the GPS.

FIG. 18 is a process flowchart of the operation control in consideration of synchronization by the GPS. The GPS receiver 54 of each BBU receives the GPS signal (S40). The GPS receiver 54 generates reference clocks in accordance with the received GPS signal. The BBUs, which receive the same GPS signal, may be synchronized.

The synchronized BBUs output synchronization signals to the CPRISW 6, each RRH and each UE. Outputting the synchronization signals from the synchronized BBUs allows synchronization of the entire devices which constitutes the wireless communication system 1.

The synchronized BBUs transmit identification information and traffic amount information to the management server 2 (S42). The management server 2 determines whether each BBU and each RRH is to operate or to stop in accordance with the received identification information and the traffic amount information (S43). The management server 2 determines the cell number to be assigned to each BBU, each RRH and each UE in accordance with the monitoring result of the EMS and the operation determination table.

The management server 2 notifies the determined cell number to each BBU (S44). The management server 2 notifies each UE, via the BBU, of the determined cell number together with the frame number at the time of switching (S45). Each UE changes the cell number autonomously by the execution of compulsory handover at the timing at which the notified frame number is received. Previous notification allows each UE to start the handover to a new cell number before the switching operation of the operational state of each BBU and each RRH is performed. Since synchronization is achieved by the synchronization signals from the BBUs, handover of each UE may be performed at the same time as the switching operation of each BBU.

The management server 2 transmits, to the CPRISW 6, a switching signal together with the frame number at which the switching operation is performed so as to instruct the switching operation of connection (S46). At the time of receiving the frame number, the switch controller 62 of the CPRISW 6 which received the switching signal switches the connection of the switch processor 63 in accordance with the instruction content.

The management server 2 transmits, to each BBU, the control signal for the instruction to operate or stop each BBU at the time of transmitting the frame number at which the switching operation of the CPRISW 6 is performed (S47). The power supply controller 51 of each BBU which received the control signal lets the signal processor 52 operate or stop in accordance with the control signal. The management server 2 transmits, to the RRHs of which covering cell ranges have no UE under communication, the control signal for the instruction to operate or stop the RRH at the time of transmitting the frame number at which the switching operation of the CPRISW 6 is performed (S47). The power supply controller 71 of the RRH which received the control signal let the RF processor 72 operate or stop in accordance with the control signal.

The management server 2 outputs a cell number change notification signal to each BBU and each RRH at the time of transmitting the frame number at which switching operation of the CPRISW 6 is performed (S48). The cell number of each UE is changed to a new cell number and each BBU and each RRH which received the cell number change notification signal obtain new cell numbers at the time of transmitting the frame number at which switching operation of the CPRISW 6 is performed (S49).

As described above, the management server 2 switches the relation of connection of each BBU and each RRH, which are synchronized, at the time of transmitting the frame number at which switching operation of the CPRISW 6 is performed. Synchronization among the devices using the GPS signal allows the switching operation of the relation of connection of the wireless communication system 1 without any instantaneous interruption of the management server 2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A wireless communication system comprising:
   a plurality of mobile terminals;
   a plurality of transceivers having a specific area, respectively, each of the plurality of transceivers performing wireless communication with a mobile terminal which is in the specific area;
   a plurality of baseband signal processors which modulates data to be transmitted to one of the plurality of transceivers and demodulates data received from one of the plurality of transceivers;
   a switch which switches the connection of the plurality of transceivers and the plurality of baseband processors; and
   a controller which calculates an operation rate of the transceivers and the baseband processors, continues or stops a power supply for driving the transceivers and the baseband processors in accordance with a calculation result of the operation rate, and controls the switch to reconnect the transceivers coupled to one of the baseband processors of which the power supply has been stopped to another baseband processor of which the power supply is continued;
   wherein the controller continues or stops the power supply to the baseband processor on the basis of the operation rate of the baseband processor and switches a cell number which specifies the cell assigned to a wireless unit and to the baseband processor.

2. The wireless communication system according to claim 1, wherein
   the controller controls the switch to:
   reproduce packet data received from the baseband processor of which the power supply is continued and transmits the same packet data to the plurality of transceivers coupled to the baseband processor of which the power supply is continued; and
   add up the packet data received from the plurality of transceivers and output the added packet data to the baseband processor to which the power supply is continued.

3. The wireless communication system according to claim 1, wherein:
   the wireless unit and the baseband processor store information about an operation control signal representing continuation or stop of the power supply, and a cell number notification signal representing the cell number after switching the cell number;
   the switch stores information about a connection control signal representing the relation of connection after switching the cell number;
   the wireless unit and the baseband processor continue or stop the power supply in accordance with the information about the stored operation control signal in accordance with a cell number change notification signal representing a change in the cell number transmitted from the controller, and switch the cell number in accordance with the information about the stored cell number notification signal; and
   the switch switches the relation of connection in accordance with the information about the stored connection control signal in accordance with the cell number change notification signal.

4. The wireless communication system according to claim 1, wherein the controller controls to stop the power supply to the wireless unit when no mobile terminal exists in the specific area of the wireless unit.

5. The wireless communication system according to claim 1, wherein the switch includes a counter which counts time until the relation of connection is switched, and sets a count value of the counter in accordance with a difference value of a frame number of received data and a frame number indicating switching timing of the relation of connection transmitted from the controller.

6. The wireless communication system according to claim 1, wherein each of the plurality of baseband processors includes a GPS receiver which provides synchronization among the plurality of baseband processors in accordance with received GPS signal and outputs synchronization signal for synchronizing the transceivers and the mobile terminals with the baseband processors.

* * * * *